United States Patent
Park et al.

(10) Patent No.: US 11,871,420 B2
(45) Date of Patent: Jan. 9, 2024

(54) METHOD FOR TRANSMITTING AND RECEIVING UPLINK CHANNEL IN WIRELESS COMMUNICATION SYSTEM, AND DEVICE FOR SAME

(71) Applicant: LG ELECTRONICS INC., Seoul (KR)

(72) Inventors: Jonghyun Park, Seoul (KR); Jiwon Kang, Seoul (KR); Hyungtae Kim, Seoul (KR); Haewook Park, Seoul (KR)

(73) Assignee: LG Electronics Inc., Seoul (KR)

(*) Notice: Subject to any disclaimer, the term of this patent is extended or adjusted under 35 U.S.C. 154(b) by 95 days.

(21) Appl. No.: 17/054,708

(22) PCT Filed: May 13, 2019

(86) PCT No.: PCT/KR2019/005734
§ 371 (c)(1),
(2) Date: Nov. 11, 2020

(87) PCT Pub. No.: WO2019/216733
PCT Pub. Date: Nov. 14, 2019

(65) Prior Publication Data
US 2021/0068142 A1    Mar. 4, 2021

(30) Foreign Application Priority Data
May 11, 2018 (KR) .................. 10-2018-0054170

(51) Int. Cl.
*H04W 72/23* (2023.01)
*H04W 72/0453* (2023.01)

(52) U.S. Cl.
CPC ....... *H04W 72/23* (2023.01); *H04W 72/0453* (2013.01)

(58) Field of Classification Search
CPC ......... H04W 72/1289; H04W 72/0453; H04W 72/1268; H04B 7/0456
See application file for complete search history.

(56) References Cited

U.S. PATENT DOCUMENTS

| | | |
|---|---|---|
| 2018/0042028 A1 | 2/2018 | Nam et al. |
| 2018/0270799 A1* | 9/2018 | Noh ............... H04L 1/1812 |
| 2018/0367205 A1* | 12/2018 | Liu ................. H04W 24/10 |
| 2019/0037565 A1* | 1/2019 | Zheng ............. H04W 72/04 |

(Continued)

OTHER PUBLICATIONS

62565687, Specification, Sep. 29, 2017 (Year: 2017).*

(Continued)

*Primary Examiner* — Yu-Wen Chang
(74) *Attorney, Agent, or Firm* — Fish & Richardson P.C.

(57) ABSTRACT

Disclosed in the disclosure is a method for transmitting and receiving an uplink channel in a wireless communication system, and a device for same. Specifically, a method by which user equipment (UE) performs uplink transmission in a wireless communication system may include: a step for receiving two or more pieces of downlink control information (DCI) from a base station; a step for determining whether the two or more pieces of DCI are used for scheduling a multi-panel uplink transmission; and a step for performing the multi-panel uplink transmission to the base station on the basis of the two or more pieces of DCI.

13 Claims, 9 Drawing Sheets

(56) References Cited

U.S. PATENT DOCUMENTS

| | | | |
|---|---|---|---|
| 2019/0068263 A1* | 2/2019 | Yu | H04B 7/0686 |
| 2019/0140729 A1* | 5/2019 | Zhang | H04W 76/27 |
| 2019/0230597 A1* | 7/2019 | Akkarakaran | H04W 52/367 |
| 2020/0008231 A1* | 1/2020 | Vilaipornsawai | H04W 72/21 |
| 2020/0022177 A1* | 1/2020 | Liu | H04L 5/0053 |
| 2020/0036425 A1* | 1/2020 | Ren | H04L 5/0091 |
| 2020/0177254 A1* | 6/2020 | Lee | H04B 7/0626 |
| 2020/0196333 A1* | 6/2020 | Lin | H04L 1/0027 |
| 2020/0329487 A1* | 10/2020 | Chen | H04L 5/0044 |
| 2020/0358494 A1* | 11/2020 | Tang | H04B 7/0482 |
| 2020/0374060 A1* | 11/2020 | Wang | H04L 5/0048 |
| 2020/0389885 A1* | 12/2020 | Tomeba | H04W 72/044 |
| 2021/0044388 A1* | 2/2021 | Cao | H04L 27/14 |
| 2021/0112528 A1* | 4/2021 | Lee | H04W 72/23 |
| 2021/0144714 A1* | 5/2021 | Takeda | H04W 72/0453 |
| 2021/0160910 A1* | 5/2021 | Matsumura | H04W 72/21 |
| 2021/0234628 A1* | 7/2021 | Nakamura | H04W 72/1289 |
| 2021/0235491 A1* | 7/2021 | Iyer | H04W 72/23 |
| 2021/0297118 A1* | 9/2021 | Kwak | H04B 7/0452 |
| 2021/0360591 A1* | 11/2021 | Ji | H04W 72/23 |

OTHER PUBLICATIONS

Intel Corporation, "On Codebook Based UL Transmission," R1-1800306, 3GPP TSG RAN WG1 Meeting AH 1801, Vancouver, Canada, Jan. 22-26, 2018, 4 pages.

LG Electronics, "Discussion on codebook based transmission for UL," R1-1713136, 3GPP TSG RAN WG1 Meeting #90, Prague, Czech Republic, Aug. 21-25, 2017, 5 pages.

PCT International Search Report in International Appln. No. PCT/KR2019/005734, dated Sep. 11, 2019, 4 pages (with English translation).

Samsung, "Discussion on DL/UL multi-TRP/-panel supports," R1-1717598, 3GPP TSG RAN WG1 Meeting 90bis, Prague, CZ, Oct. 9-13, 2017, 8 pages.

ZTE, "Multi-TRP Transmission and interference coordination," R1-1710180, 3GPP TSG RAN WG1 NR Ad-Hoc#2, Qingdao, P.R. China, Jun. 27-30, 2017, pages.

* cited by examiner

[FIG. 1]
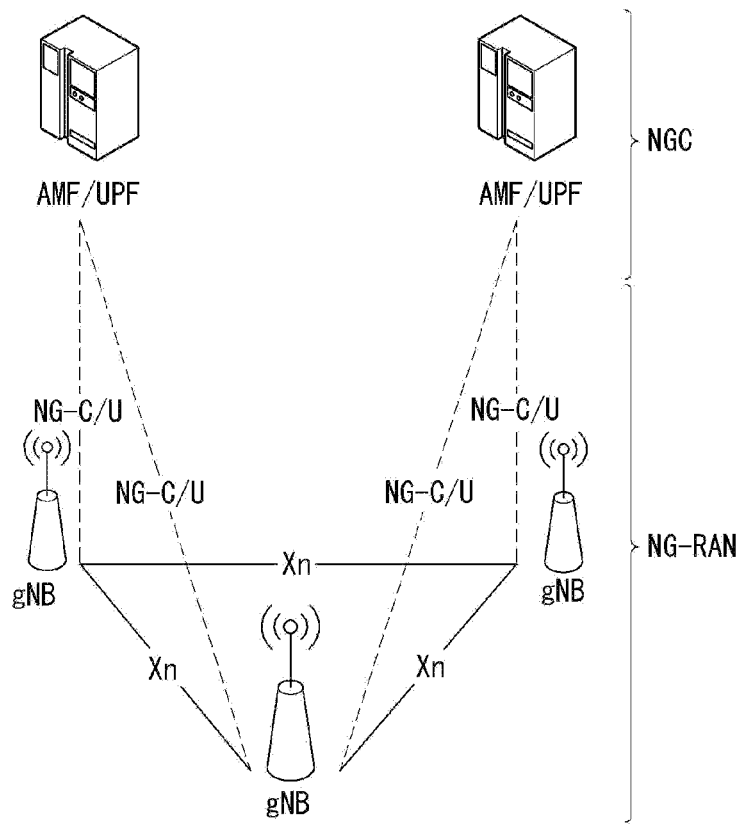
[FIG. 2]
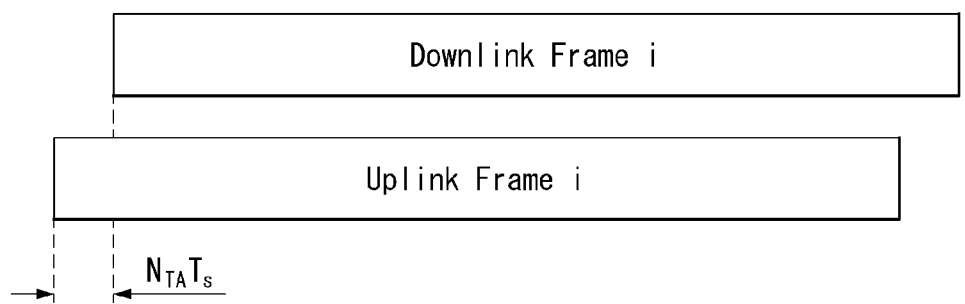

[FIG. 3]
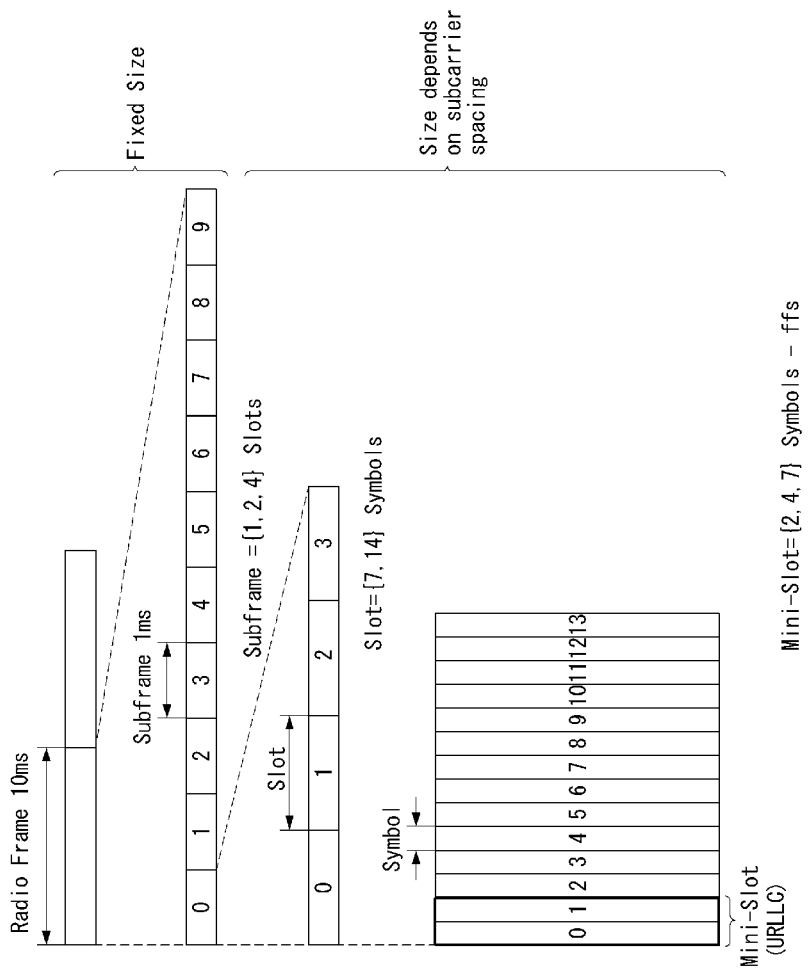

[FIG. 4]
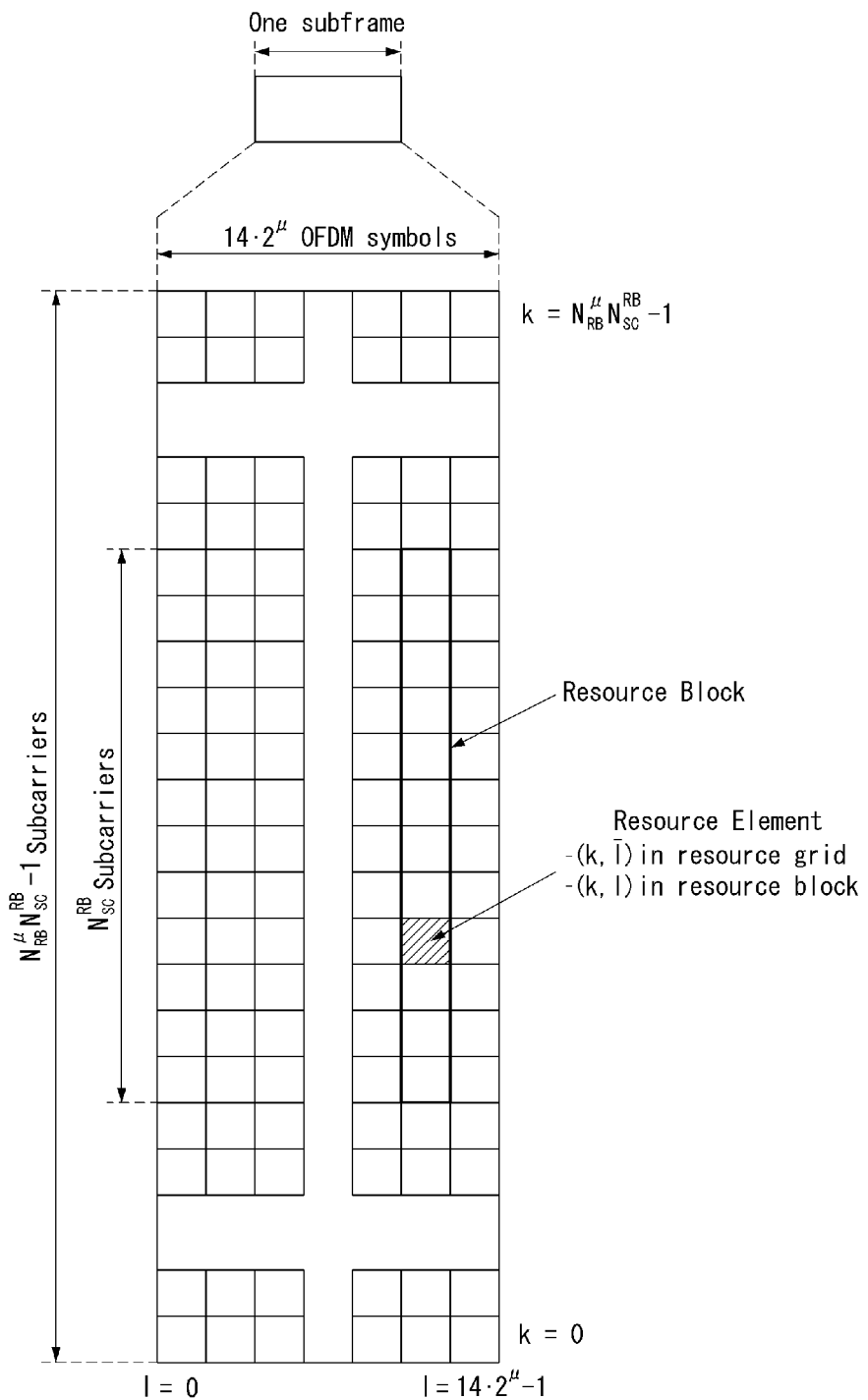

[FIG.5]
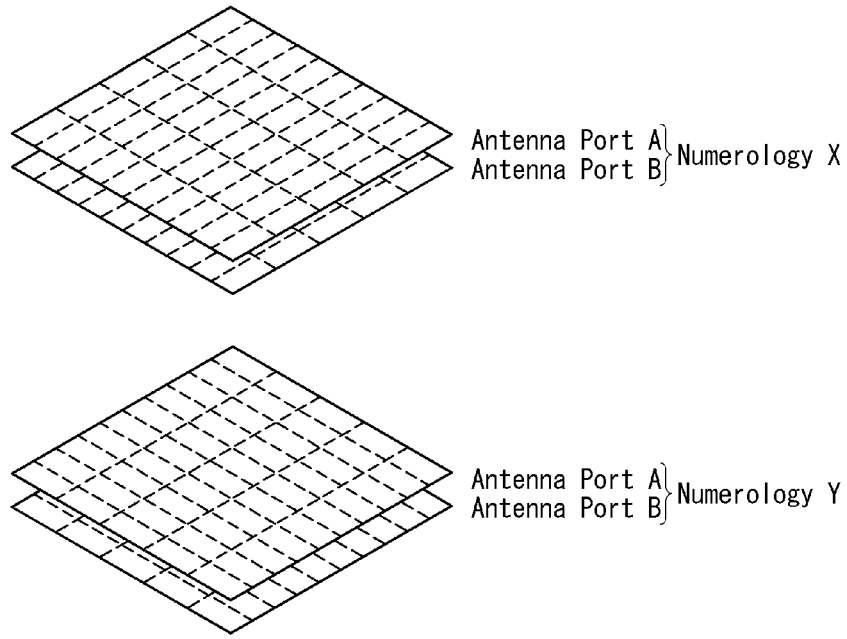
[FIG.6]
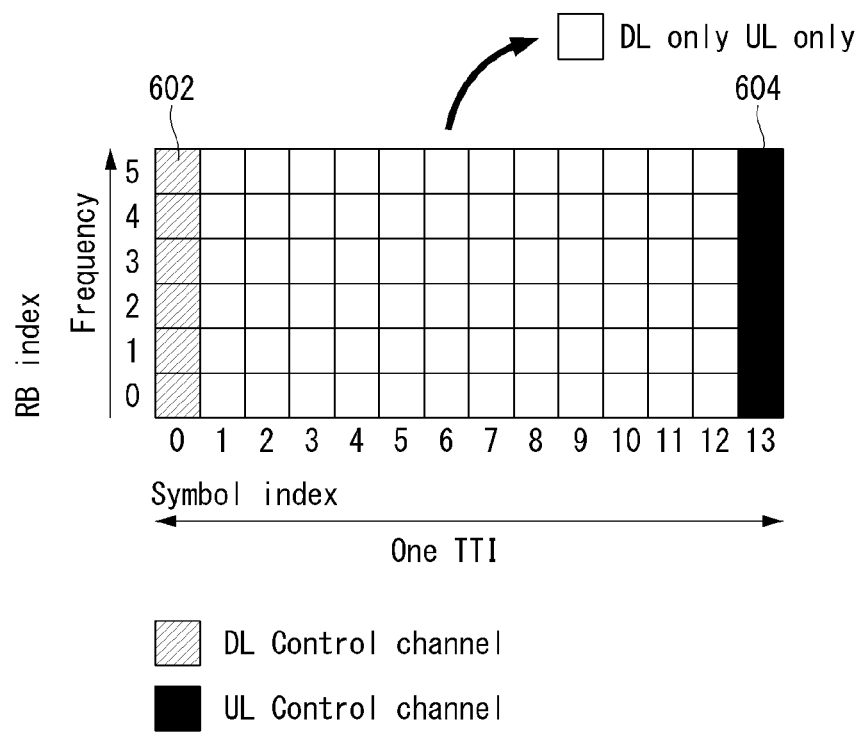

[FIG. 7]
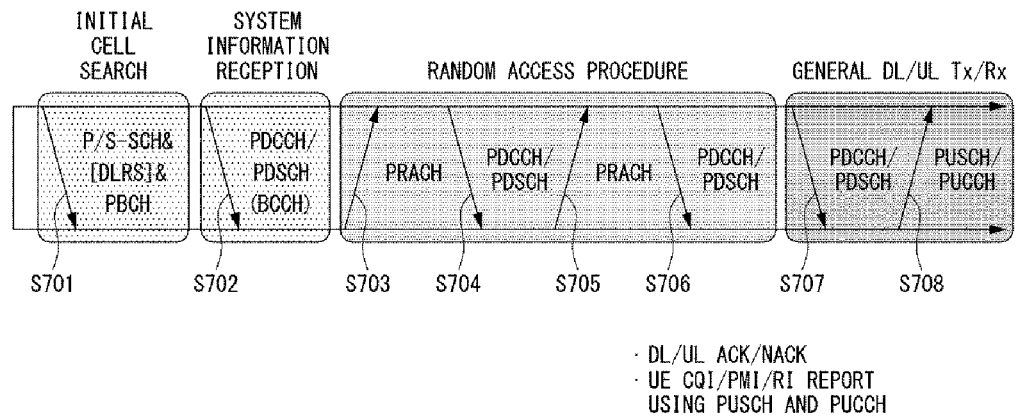
[FIG. 8]
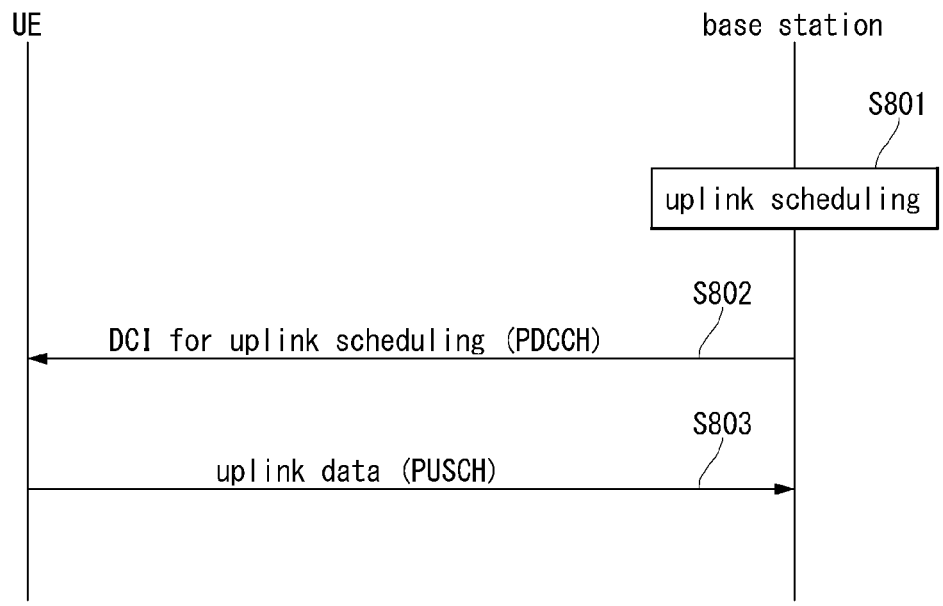

[FIG. 9]
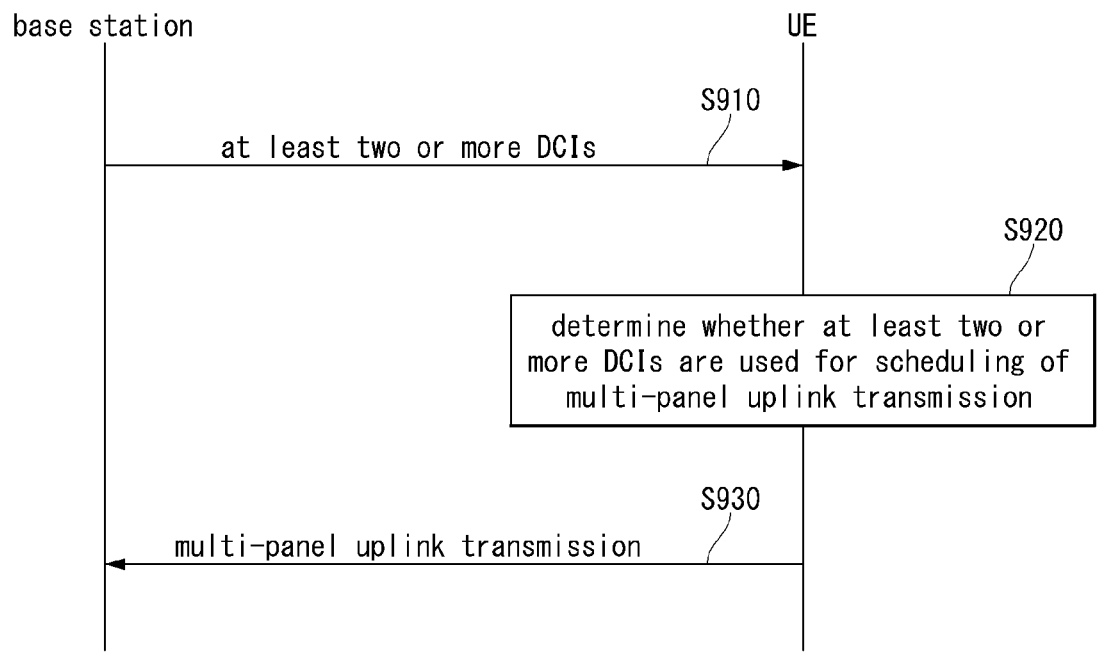
[FIG. 10]
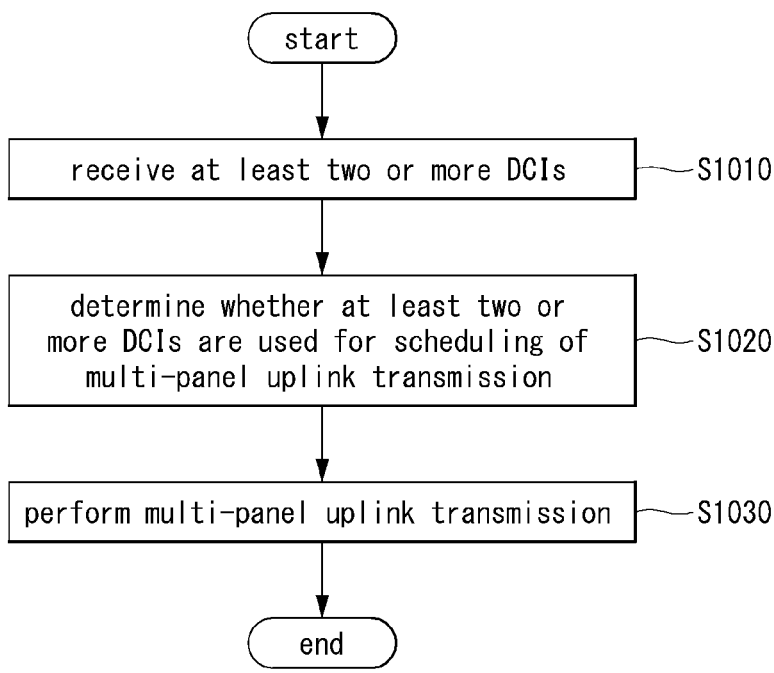

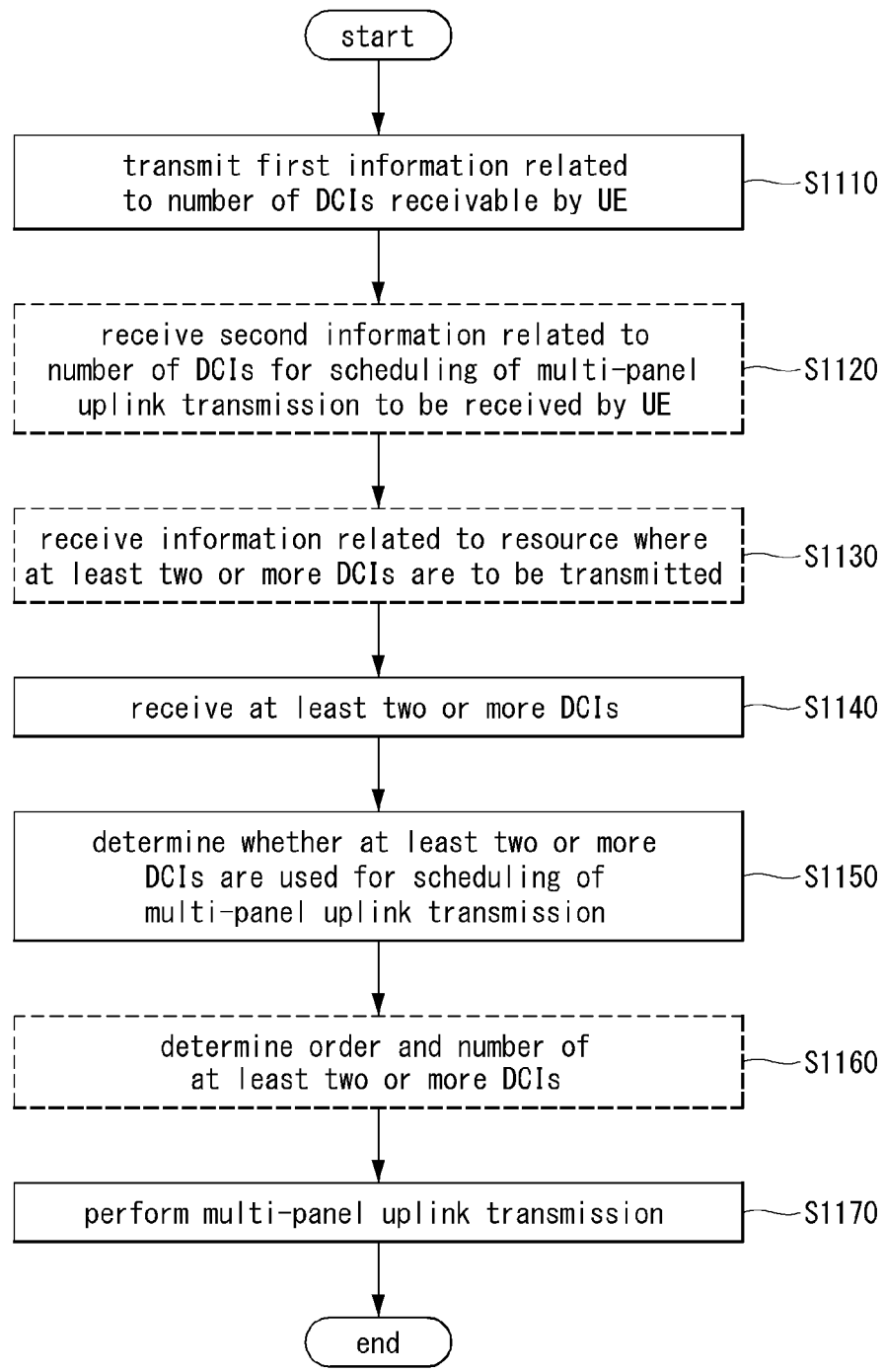
[FIG. 11]

[FIG. 12]
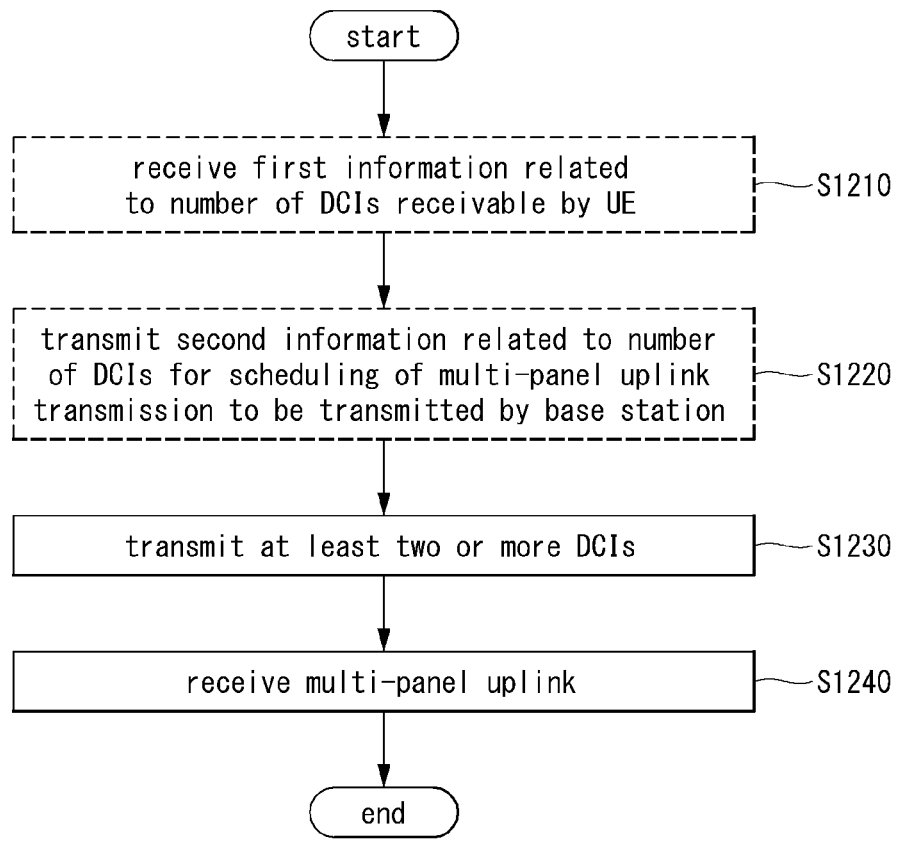
[FIG. 13]
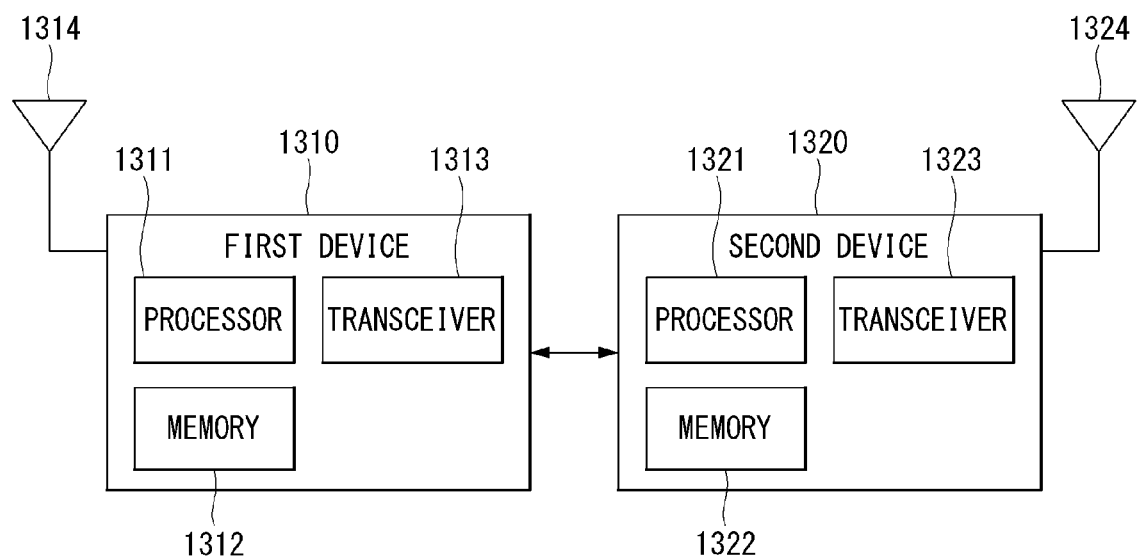

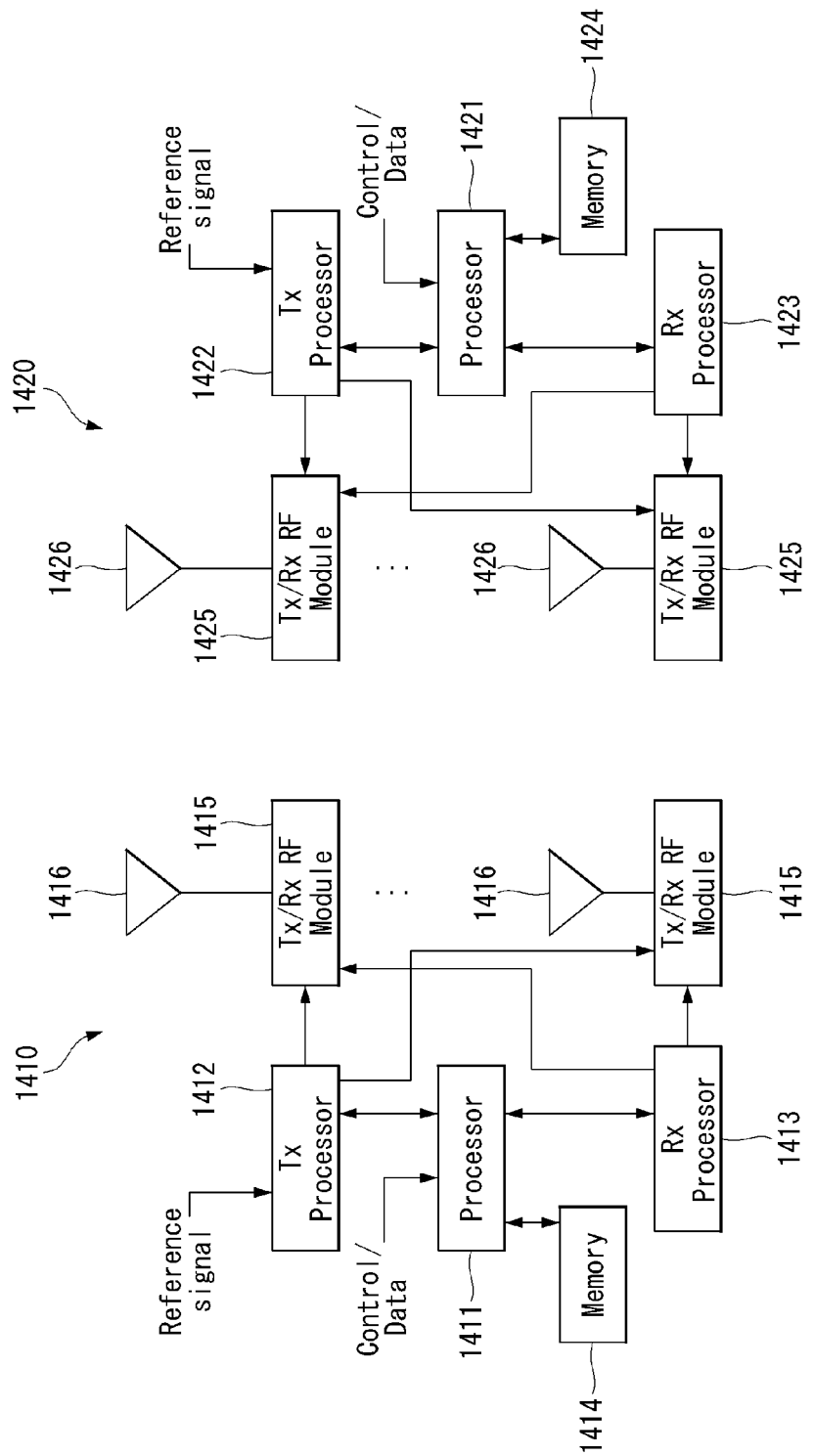
[FIG. 14]

US 11,871,420 B2

METHOD FOR TRANSMITTING AND RECEIVING UPLINK CHANNEL IN WIRELESS COMMUNICATION SYSTEM, AND DEVICE FOR SAME

CROSS-REFERENCE TO RELATED APPLICATIONS

This application is a National Stage application under 35 U.S.C. § 371 of International Application No. PCT/KR2019/005734, filed on May 13, 2019, which claims the benefit of Korean Patent Application No. 10-2018-0054170, filed on May 11, 2018. The disclosures of the prior applications are incorporated by reference in their entirety.

TECHNICAL FIELD

The disclosure relates to wireless communication systems, and more specifically, to methods for transmitting/receiving an uplink channel based on multi-panel and devices for supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

In the disclosure, there is proposed a method for transmitting/receiving an uplink channel based on multi-panel in a method for transmitting/receiving an uplink channel in a wireless communication system.

Specifically, the disclosure proposes a scheduling method of multi-panel uplink transmission using a plurality of DCIs to transmit/receive an uplink channel based on multi-panel.

Technical problems to be solved by the disclosure are not limited by the above-mentioned technical problems, and other technical problems which are not mentioned above may be clearly understood from the following description by those skilled in the art to which the disclosure pertains.

Technical Solution

According to an embodiment of the disclosure, a method for performing uplink transmission by a user equipment (UE) in a wireless communication system comprises receiving at least two or more downlink control information (DCIs) from a base station, determining whether the at least two or more DCIs are used for a scheduling of multi-panel uplink transmission, and performing the multi-panel uplink transmission to the base station, based on the at least two or more DCIs.

According to an embodiment of the disclosure, the method further comprises transmitting, to the base station, first information related to a number of DCIs receivable by the UE.

According to an embodiment of the disclosure, the method further comprises receiving, from the base station, second information related to a number of DCIs for the scheduling of multi-panel uplink transmission to be received by the UE.

In the method according to an embodiment of the disclosure, the second information is configured in an unit of a component carrier or a bandwidth part (BWP).

In the method according to an embodiment of the disclosure, the at least two or more DCIs are received at a same time.

In the method according to an embodiment of the disclosure, the multi-panel uplink transmission is transmitted at a same time based on at least one of a scheduling offset or a reception timing of each of the at least two or more DCIs.

In the method according to an embodiment of the disclosure, resource regions corresponding to resource allocation field values individually included in the at least two or more DCIs are overlapped.

In the method according to an embodiment of the disclosure, the at least two or more DCIs include at least one of an MCS field or precoder co-phasing information.

According to an embodiment of the disclosure, the method further comprises determining at least one of an order or number of the at least two or more DCIs. At least one of the order or number is determined based on a radio network temporary identifier (RNTI) value of each DCI.

In the method according to an embodiment of the disclosure, whether the at least two or more DCIs are used for scheduling of the multi-panel uplink transmission is determined based on a specific field included in each of the at least two or more DCIs.

According to an embodiment of the disclosure, the method further comprises receiving, from the base station, information related to a resource where the at least two or more DCIs are transmitted.

In the method according to an embodiment of the disclosure, the multi-panel uplink transmission is performed based on a combination of information included in each of the at least two or more DCIs.

In the method according to an embodiment of the disclosure, each of the at least two or more DCIs includes an SRS resource indicator (SRI). A resource corresponding to each SRI is mapped to each panel constituting the multi-panel, and the multi-panel uplink transmission is performed.

In the method according to an embodiment of the disclosure, the multi-panel uplink transmission is performed by applying at least one of a timing advance (TA) value or a power control parameter which are common per each panel of the multi-panel.

According to an embodiment of the disclosure, a user equipment (UE) performing uplink transmission in a wireless communication system comprises a transmitter for transmitting a radio signal, a receiver for receiving a radio signal; and a processor functionally connected with the transmitter and the receiver. The processor controls the receiver to receive at least two or more downlink control information (DCIs) from a base station, determines whether the at least two or more DCIs are used for a scheduling of multi-panel uplink transmission, and controls the transmitter to perform the multi-panel uplink transmission to the base station, based on the at least two or more DCIs.

Advantageous Effects

According to an embodiment of the disclosure, an uplink channel may be transmitted/received based on multi-panel.

Further, according to an embodiment of the disclosure, it is possible to perform uplink scheduling using a plurality of DCIs without significantly changing the payload size of the existing DCI to schedule uplink transmission based on multi-panel.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates an example of an overall structure of an NR system to which a method proposed in the disclosure may be applied.

FIG. 2 illustrates the relation between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates an example self-contained structure to which a method proposed herein is applicable.

FIG. 7 illustrates an example signal transmission/reception method.

FIG. 8 illustrates an example uplink transmission/reception operation.

FIG. 9 illustrates an example signaling procedure between a UE and a base station performing multi-panel uplink transmission/reception to which an embodiment proposed in the disclosure is applicable.

FIG. 10 is an example flowchart illustrating operations of a UE transmitting an uplink channel based on multi-panel in a wireless communication system to which a method as proposed according to the disclosure is applicable.

FIG. 11 is another example flowchart illustrating operations of a UE transmitting an uplink channel based on multi-panel in a wireless communication system to which a method as proposed according to the disclosure is applicable.

FIG. 12 is an example flowchart illustrating operations of a base station receiving an uplink channel based on multi-panel in a wireless communication system to which a method as proposed according to the disclosure is applicable.

FIG. 13 is a block diagram of a wireless communication device to which methods proposed in the disclosure may be applied.

FIG. 14 illustrates another example of a block diagram of a wireless communication device to which methods proposed in the disclosure may be applied.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the disclosure may be referred to for a background art, terms, abbreviations, etc., used for describing the disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple Use Cases are Described More Specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the disclosure may be applied.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defied by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | Δf = $2^μ \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s = 10$ ms. The radio frame is composed of ten subframes each having a section of $T_{sf}=(\Delta f_{max} N_f/1000) \cdot T_s = 1$ ms. In this case, there may be a set of UL frames and a set of DL frames.

FIG. 2 illustrates the relation between an uplink frame and a downlink frame in a wireless communication system to which a method proposed in the disclosure may be applied.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^μ \in \{0, \ldots, N_{subframe}^{slots, μ}-1\}$ within a subframe and are numbered in increasing order of $n_{s,f}^μ \in \{0, \ldots, N_{frame}^{slots, μ}-1\}$ within a radio frame. One slot consists of consecutive OFDM symbols of $N_{symb}^μ$, and $N_{symb}^μ$ is determined depending on a numerology used and slot configuration. The start of slots $n_s^μ$ in a subframe is aligned in time with the start of OFDM symbols $n_s^μ N_{symb}^μ$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{slot}^{frame, μ}$ of slots per radio frame, and the number $N_{slot}^{subframe, μ}$ of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame, μ}$ | $N_{slot}^{subframe, μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, μ}$ | $N_{slot}^{subframe, μ}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 3, in case of μ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc. May be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the disclosure may be applied.

Referring to FIG. 4, a resource grid consists of $N_{RB}^μ N_{sc}^{RB}$ subcarriers on a frequency domain, each subframe consisting of $14 \cdot 2^μ$ OFDM symbols, but the disclosure is not limited thereto.

In the NR system, a transmitted signal is described by one or more resource grids, consisting of $N_{RB}^μ N_{sc}^{RB}$ subcarriers, and $2^μ N_{symb}^{(μ)}$ OFDM symbols, where $N_{RB}^μ \leq N_{RB}^{max,μ}$. $N_{RB}^{max,μ}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l), where k=0, ..., $N_{RB}^μ N_{sc}^{RB}-1$ is an index on a frequency domain, and l=0, ..., $2^μ N_{symb}^{(μ)}-1$ refers to a location of a symbol in a subframe. The index pair (k,l) is used to refer to a resource element in a slot, where l=0, ..., $N_{symb}^μ-1$.

The resource element (k,l) for the numerology μ and the antenna port p corresponds to a complex value $a_{k,l}^{(p,μ)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration µ.

The center of subcarrier 0 of common resource block 0 for the subcarrier spacing configuration µ coincides with 'point A'. A common resource block number $n_{CRB}^\mu$ in the frequency domain and resource elements (k, l) for the subcarrier spacing configuration µ may be given by the following Equation 1.

$$n_{CRB}^\mu = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $N_{BWP,i}^{start}$ may be the common resource block where the BWP starts relative to the common resource block 0.

Bandwidth Part, BWP

An NR system may be supported up to a maximum of 400 MHz per one component carrier (CC). If a terminal operating in such a wideband CC operates with its RF for all CCs being turned on, terminal battery consumption may be increased. Alternatively, if several use cases (e.g., eMBB, URLLC, Mmtc, V2X) operating within one wideband CC are taken into consideration, a different numerology (e.g., sub-carrier spacing) for each frequency band within the corresponding CC may be supported. Alternatively, the capability of a maximum bandwidth may be different for each terminal. A base station may indicate that the terminal operates only in some bandwidth not the full bandwidth of the wideband CC by taking the capacity into consideration. The corresponding some bandwidth is defined as a bandwidth part (BWP), for convenience sake. The BWP may be configured with resource blocks (RBs) contiguous on a frequency axis, and may correspond to one numerology (e.g., sub-carrier spacing, CP length, slot/mini-slot duration).

Meanwhile, a base station may configure multiple BWPs within one CC configure in a terminal. For example, in a PDCCH monitoring slot, a BWP occupying a relatively small frequency domain may be configured, and a PDSCH indicated in a PDCCH may be scheduled on a BWP greater than the configured BWP. Alternatively, if UEs are crowded in a specific BWP, some UEs may be configured in other BWP for load balancing. Alternatively, some spectrum at the center of a full bandwidth may be excluded by taking into consideration frequency domain inter-cell interference cancellation between neighbor cells, and BWPs on both sides may be configured in the same slot. That is, the base station may configure at least one DL/UL BWP in a terminal associated with a wideband CC, may activate at least one DL/UL BWP of DL/UL BWP(s) (by L1 signaling or MAC CE or RRC signaling) configured in a specific time. Switching to another configured DL/UL BWP (by L1 signaling or MAC CE or RRC signaling) may be indicated or switching to a predetermined DL/UL BWP may be performed when a timer value expires based on a timer.

In this case, the activated DL/UL BWP is defined as an active DL/UL BWP. One UE may support one active DL BWP at one time for a DL carrier in the cell. Further, the UE may support a maximum of one active UL BWP in UL, UL and SUL, or only SUL according to whether to configure the SUL. Specifically, when the SUL is not configured, a maximum of one active UL BWP may be configured in the UL carrier corresponding to the DL carrier. Alternatively, when dynamically switched SUL is configured, a maximum of one active UL BWP may be configured in each UL and SUL. Alternatively, when only the SUL is used, a maximum of one active UL BWP may be configured in the SUL carrier. The UE may expect that both the DL BWP and the UL BWP simultaneously correspond to the same numerology in a given cell except for the UL BWP of the SUL carrier. The SUL carrier may support a different numerology from the DL carrier in the cell and support a numerology equal to or smaller than the numerology of the DL carrier.

However, if a terminal is in an initial access process or in a situation before an RRC connection is set up, the terminal may not receive a configuration for a DL/UL BWP. In such a situation, a DL/UL BWP assumed by the terminal is defined as an initial active DL/UL BWP.

Self-Contained Structure

A time division duplexing (TDD) structure taken into consideration in an NR system is a structure in which both uplink (UL) and downlink (DL) are processed in one slot (or subframe). This is for minimizing latency of data transmission in the TDD system. The structure may be referred to as a self-contained structure or a self-contained slot.

FIG. 6 shows an example of a self-contained structure according to some implementations of this disclosure. FIG. 6 is merely for convenience of description and does not limit the scope of the disclosure.

Referring to FIG. 6, as in the case of legacy LTE, a case where one transmission unit (e.g., slot, subframe) is configured with 14 orthogonal frequency division multiplexing (OFDM) symbols is assumed.

In FIG. 6, a region 602 means a downlink control region, and a region 604 means an uplink control region. Furthermore, regions (i.e., regions not having separate indication) except the region 602 and the region 604 may be used for the transmission of downlink data or uplink data.

That is, uplink control information and downlink control information may be transmitted in one self-contained slot. In contrast, in the case of data, uplink data or downlink data may be transmitted in one self-contained slot.

If the structure shown in FIG. 6 is used, downlink transmission and uplink transmission are sequentially performed, and the transmission of downlink data and the reception of uplink ACK/NACK may be performed within one self-contained slot.

Consequently, when an error occurs in data transmission, the time consumed up to the retransmission of data can be reduced. Accordingly, latency related to data forwarding can be minimized.

In a self-contained slot structure, such as FIG. 6, there is a need for a time gap for a process of a base station (eNodeB, eNB, gNB) and/or a terminal (user equipment (UE)) changing from a transmission mode to a reception mode or of the base station and/or the terminal changing from a reception mode to a transmission mode. In relation to the time gap, when uplink transmission is performed after downlink transmission in a self-contained slot, some OFDM symbol(s) may be configured as a guard period (GP).

Method for Transmitting and Receiving Wireless Signal

FIG. 7 shows an example of a method of transmitting and receiving a signal.

Referring to FIG. 7, when the UE is powered on or newly enters a cell, the UE performs an initial cell search operation such as synchronizing with the eNB (S701). To this end, the UE may receive a Primary Synchronization channel (P-SCH) and a Secondary Synchronization channel (S-SCH) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S702).

Meanwhile, when there is no radio resource first accessing the eNB or for signal transmission, the UE may perform a Random Access Procedure (RACH) to the eNB (S703 to S706). To this end, the UE may transmit a specific sequence to a preamble through a Physical Random Access Channel (PRACH) (S703 and S705) and receive a response message for the preamble through the PDCCH and a corresponding PDSCH (S704 and S706). In the case of a contention based RACH, a Contention Resolution Procedure may be additionally performed.

The UE that performs the above procedure may then perform PDCCH/PDSCH reception (S707) and Physical Uplink Shared Channel (PUSCH)/Physical Uplink Control Channel (PUCCH) transmission (S708) as a general uplink/downlink signal transmission procedure. In particular, the UE may receive Downlink Control Information (DCI) through the PDCCH. Here, the DCI may include control information such as resource allocation information for the UE and formats may be different according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. In the case of 3GPP LTE system, the UE may transmit the control information such as the CQI/PMI/RI, etc., through the PUSCH and/or PUCCH.

Table 4 shows an example of a DCI format in NR system.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

Referring to Table 4, DCI format 0_0 is used to schedule the PUSCH in one cell.

The information contained in DCI format 0_0 may be CRC scrambled by the C-RNTI or CS-RNTI or MCS-C-RNTI and transmitted. DCI format 0_1 is used to reserve the PUSCH in one cell. The information contained in DCI format 0_1 may be CRC scrambled by the C-RNTI, CS-RNTI, SP-CSI-RNTI or MCS-C-RNTI and transmitted. DCI format 1_0 is used to schedule the PDSCH in one DL cell. The information contained in DCI format 1_0 may be CRC scrambled by the C-RNTI or CS-RNTI or MCS-C-RNTI and transmitted. DCI format 1_1 is used to schedule the PDSCH in one cell. The information contained in DCI format 1_1 may be CRC scrambled by the C-RNTI or CS-RNTI or MCS-C-RNTI and transmitted. DCI format 2_1 is used to indicate PRB(s) and OFDM symbol(s) that may be assumed not to be transmitted by the UE.

The following information contained in DCI format 2_1 is CRC scrambled by the INT-RNTI and transmitted.

UL Transmission/Reception Operation

FIG. 8 is a flowchart showing an example of an uplink transmission/reception operation.

Referring to FIG. 8, the eNB schedules uplink transmission such as the frequency/time resource, the transport layer, an uplink precoder, the MCS, etc., (S801). In particular, the eNB may determine a beam for PUSCH transmission of the UE through the aforementioned beam management operations. And, the UE receives DCI for downlink scheduling (i.e., including scheduling information of the PUSCH) on the PDCCH (S802). DCI format 0_0 or 0_1 may be used for the uplink scheduling and in particular, DCI format 0_1 includes the following information: Identifier for DCI formats), UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

In addition, the UE transmits the uplink data to the eNB on the PUSCH (S803). When the UE detects a PDCCH including DCI format 0_0 or 0_1, the UE transmits the corresponding PUSCH according to the indication by the corresponding DCI. Two transmission schemes, i.e., codebook based transmission and non-codebook based transmission are supported for PUSCH transmission.

In the case of the codebook based transmission, when higher layer parameter txConfig' is set to 'codebook', the UE is configured to the codebook based transmission. On the contrary, when higher layer parameter txConfig' is set to 'nonCodebook', the UE is configured to the non-codebook based transmission. When higher layer parameter 'txConfig' is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'. When the UE is set to higher layer parameter 'txConfig' set to 'codebook', at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'non-Codebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

As described above, the uplink transmission schemes supported in the 3GPP NR standard may be divided into codebook-based uplink (UL) transmission schemes and non-codebook-based UL transmission schemes. In the current codebook-based UL transmission scheme, only a scheme in which a single SRS resource indicator (SRS) is indicated upon uplink scheduling is allowed. Thus, the scheme may be regarded as a single-panel-based UL transmission scheme and, for ease of description, this is referred to as a single-panel uplink (SPUL) transmission scheme. In addition, since the best SRI may be dynamically indicated in uplink scheduling (UL grant), a single-panel corresponding to the SRI may be considered to be instantaneously and dynamically selected.

Unlike in the prior art, the disclosure considers an improved and new codebook-based uplink channel transmission/reception method for user equipment (UE) having multi-panel (or Tx chains, etc.). In other words, a method for transmitting/receiving an uplink channel based on multi-panel is considered and, for ease of description, this is collectively referred to as a multi-panel uplink (MPUL) transmission scheme.

As used herein, "panel" may be changed to and interpreted/applied as a "plurality of (or at least one) panels" or a "panel group" (having similarity/common value in a specific characteristic aspect (e.g., timing advance (TA), power control parameter, etc.).

Or, as used herein, "panel" may be changed to and interpreted/applied as a "plurality of (or at least one) antenna ports" or a "plurality of (or at least one) uplink resources" or an "antenna port group" or an "uplink resource group (or set)" (having similarity/common value in a specific characteristic aspect (e.g., TA, power control parameter, etc.).

Or, as used herein, "panel" may be changed to and interpreted/applied as a "plurality of (or at least one) beams" or "at least one beam group (or set)" (having similarity/common value in a specific characteristic aspect (e.g., TA, power control parameter, etc.). Or, as used herein, "panel" may be defined as a unit for the UE to configure a transmission/reception beam. For example, "transmission panel" may be defined as a unit that may generate a plurality of candidate transmission beams in one panel but, for transmission at a specific time, may use only one beam among them (that is, for transmission of a specific uplink signal/channel, only one transmission beam (spatial relation information RS) per Tx panel may be used).

Further, as used herein, "panel" may denote a "plurality of (or at least one) antenna ports" or an "antenna port group" or an "uplink resource group (or set)" having common/similar uplink synchronization and may be changed to and interpreted/applied, more commonly, as "uplink synchronization unit (USU)". As used herein, "panel" may be changed to and interpreted/applied, more commonly, as "uplink transmission entity (UTE)."

Further, the "uplink resource (or resource group)" may be changed to and interpreted/applied as PUSCH/PUCCH/SRS/PRACH resource (or resource group (or set)). Further, the change, interpretation/application may be reversely applied. Further, as used herein, "antenna (or antenna port)" may denote a physical or logical antenna (or antenna port).

In other words, as used herein, "panel" may be interpreted in various manners, as a "UE antenna element group," "UE antenna port group," "or "UE logical antenna group" and, for what physical/logical antennas or antenna ports are bundled up and mapped into one panel, various schemes may be considered given, e.g., the inter-antenna position/distance/correlation, RF configuration, and/or antenna (port) virtualization scheme, and such mapping process may be varied depending on the implementation of the UE. Further, as used herein, "panel" may be changed to and interpreted/applied as a "plurality of panels" or a "panel group" (having similarity in a specific characteristic aspect).

In a specific example, the UE having a multi-panel capable of multi-panel uplink (MPUL) transmission may have a plurality of uplink resources (e.g., SRS resources) or a plurality of RF chains (e.g., Tx or Rx chains) corresponding to the multi-panel. Or, in the UE having the multi-panel, the panel may correspond to a resource configuration unit (e.g., a group of SRS ports) for a specific individual sounding (e.g., pilot transmission or reference signal transmission), such as the sounding reference signal (SRS) configured by the base station per specific transmission/reception device module of the UE. Accordingly, when the UE performs multi-panel uplink (MPUL) transmission, a different and/or independent number of antennas (ports) may be configured for each resource configuration unit. Or, the same number of antennas (or ports) may be configured, e.g., to simplify the system design or mitigate the complexity of implementation of the UE. Where multi-panel uplink (MPUL) is scheduled, a layer(s) may be independently indicated for uplink transmission for each resource configuration unit (e.g., which may correspond to the Tx chain). Further, a beam and/or precoder corresponding to each resource configuration unit may be independently indicated.

As described above, NR MIMO operation may be regarded as performed based on the SPUL transmission scheme. Specifically, one SRS resource indicator (SRI), a transmitted precoding matrix indicator (TPMI) value, and rank value are indicated via uplink DCI format 0_1. The UE may obtain a PUSCH precoder by applying the TPMI and rank corresponding to the SRS port belonging to the indicated SRS resource, along with the SRS beam applied at the latest time of the SRS resource, and perform uplink transmission. Where the scheme in which one TPMI is indicated per SRS resource is applied to the MPUL transmission scheme, it may be needed to, e.g., expand, add, or redefine the size of the DCI or the field in the form of multiple SRS resources and multiple TPMIs being indicated. However, since this scheme requires a change to the payload of the existing DCI, it may further complicate the UE's blind detection on the DCI.

Hereinafter, according to the disclosure, there may be considered a scheme for transmitting a plurality of DCIs for uplink scheduling (e.g., UL grant) for the UE performing multi-panel (or Tx chains)-based uplink (MPUL) transmission without significantly changing the payload as compared with the conventional single DCI for SPUL transmission scheduling. As an example, there is proposed a scheduling method of multi-panel uplink (MPUL) transmission based on multiple DCIs (at a given specific frequency (e.g., component carrier (CC) and/or bandwidth part (BWP)).

In the embodiments and/or methods described below, it is assumed that the UE receives information for uplink scheduling from the base station. The UE may perform multi-panel uplink (MPUL) transmission based on the received uplink scheduling information.

Further, the embodiments and/or methods described in the disclosure are differentiated solely for ease of description, and some components in any one method may be replaced, or combined with components of another method.

As described above, the base station may transmit downlink control information (DCI) for uplink scheduling to the UE. In particular, the base station may transmit a plurality of DCIs upon transmitting scheduling information for multi-panel uplink transmission. Proposed below is a method in which the UE receives a plurality of DCIs transmitted from the base station and determines that it is information for transmission of the multi-panel uplink (MPUL). The base station may transmit a plurality of (e.g., N') DCIs for multi-panel uplink (MPUL) transmission scheduling to the UE. The UE may be determined to receive information for scheduling of multi-panel uplink (MPUL) transmission by successfully receiving the plurality of DCIs transmitted from the base station. Here, for ease of description, it is assumed that the base station transmits two DCIs including DCI1 and DCI2. However, this is merely an example and is not intended to limit the technical spirit of the disclosure. Thus, the disclosure may also be applied to two or more DCIs.

<Method 1>

The UE may detect the DCI(s) transmitted from the base station and determine whether the DCI(s) is used for scheduling multi-panel uplink (MPUL) transmission depending on the number of DCI(s) detected.

For example, where the base station transmits two DCIs (e.g., DCI1 and DCI2) and the UE successfully receives both DCI1 and DCI2, the UE may be determined to receive the information for scheduling multi-panel uplink (MPUL) transmission. Or, where the base station transmits N' DCIs (e.g., N'>2), if the UE successfully receives at least two or more DCIs among DCI1, DCI2, . . . , DCIN' transmitted, the UE may be determined to receive the information for scheduling multi-panel uplink (MPUL) transmission. Or, where the base station transmits N' DCIs (e.g., N'>2), if the UE successfully receives all of the N' DCIs transmitted, the UE may be determined to receive the information for scheduling multi-panel uplink (MPUL) transmission. The method may advantageously simplify the system design and mitigate the complexity of the UE.

As described above, when the UE is determined to receive the DCIs for scheduling multi-panel uplink (MPUL) transmission, multi-panel uplink (MPUL) transmission may be performed based on at least two or more DCIs received. As an example, the UE, which is determined to receive DCIs for scheduling multi-panel uplink (MPUL) transmission, may map the information contained in each of the at least two or more DCIs received with each panel constituting the multi-panel and perform multi-panel uplink (MPUL) transmission. Further, the UE may perform multi-panel uplink (MPUL) transmission based on a combination of the information contained in each of the at least two or more DCIs.

As a specific example, where the UE receives both DCI1 and DCI2 transmitted from the base station, the UE may map the SRS resource corresponding to SRI1 to the panel (or Tx chain) transmitted previously (e.g., at the latest time before the reception timing of DCI1) for SRI1, rank value, and TPMI1 indicated by DCI1, apply the SRS beam and indicated rank value and TPMI1, and transmit as many PUSCH layer(s) as the rank value. Simultaneously, the UE may map the SRS resource corresponding to SRI2 to the panel (or Tx chain) transmitted previously (e.g., at the latest time before the reception timing of DCI2) for SRI2, rank value, and TPMI2 indicated by DCI2, apply the SRS beam and indicated rank value and TPMI2, and (simultaneously) transmit as many PUSCH layer(s) as the rank value. In this case, the total rank of multi-panel uplink (MPUL) PUSCH transmission corresponding to DCI1 and DCI2 may be calculated by combining (summating) the rank values indicated by the DCIs, like in the form of a sum of the rank value indicated by DCI1 and the rank value indicated by DCI2.

Or, it may be determined whether the DCIs are for scheduling multi-panel uplink (MPUL) transmission, with respect to the reception timing of the plurality of (at least two or more) DCIs transmitted from the base station. For example, as described above, when the base station transmits a plurality of DCIs for scheduling multi-panel uplink (MPUL) transmission, the UE may expect that the DCIs to be received always at the same time (e.g., the same slot). (Thus, the base station may be required to transmit the DCIs always at the same time so as to schedule multi-panel uplink (MPUL) transmission). As a specific example, when DCI1 and DCI2 are received at the same time (e.g., in the same slot), the UE may be determined to receive the DCIs for scheduling multi-panel uplink (MPUL) transmission. (Therefore, the base station may be needed to transmit DCI1 and DCI2 at the same time).

Further, the UE may expect that the scheduling offset values of the plurality of DCIs for scheduling multi-panel uplink (MPUL) transmission are the same. (Thus, the base station may be required to set and transmit the same scheduling offset value to schedule multi-panel uplink (MPUL) transmission). For example, the UE may expect that each scheduling offset value in DCI1 and DCI2 is the same. (Thus, the base station may be required to set and transmit the same scheduling offset value in DCI1 and DCI2). The scheduling offset indicates a parameter for flexibly indicating the transmission timing of PUSCH (e.g., PUSCH time domain allocation (e.g., start and length indicator (SLIV)) field). As a specific example, if a specific DCI is received with scheduling offset=3 when the specific DCI is received in slot n, the UE may start to transmit PUSCH in slot n+3 (or, e.g., the first-coming uplink transmission-available time including slot n+3).

As another example, where the multi-panel uplink (MPUL) PUSCH transmission is scheduled to be performed at the same time (e.g., the same slot) for all the ranks regardless of the time of detection of DCIs (e.g., DCI1 and DCI2), the UE may recognize them as valid DCIs for scheduling multi-panel uplink (MPUL) transmission. In other words, where uplink transmission is scheduled to be performed at the same time based on at least one of the scheduling offset or the reception timing of each of at least two or more DCIs, the UE may determine that the DCIs are used to schedule multi-panel uplink (MPUL) transmission and perform multi-panel uplink (MPUL) PUSCH transmission according thereto.

As a specific example, if DCI1 is detected in slot n and, at that time, the scheduling offset value is 3, as many PUSCH layer(s) as the rank value of DCI1 may be transmitted in slot n+3. Further, if DCI2 is detected in slot n+1 and, at that time, the scheduling offset value is 2, as many PUSCH layer(s) as the rank value of DCI2 may be transmitted in slot n+3. Thus, the UE may be determined to receive the information for scheduling MPUL transmission to perform multi-panel uplink (MPUL) transmission based on a combination of the pieces of information included in DCI1 and DCI2. The UE may perform multi-panel uplink (MPUL) PUSCH transmission in the form of the PUSCH layers all being summated (combined) and transmitted. By the above-described method, the UE may recognize the plurality of DCIs (e.g., DCI1 and DCI2) for scheduling multi-panel uplink (MPUL) transmission as paired DCIs, and the UE may perform multi-panel uplink (MPUL) PUSCH transmission at the same transmission time (e.g., the same slot). Further, it may present the effect that an effective uplink transmission scheme may be designed considering the implementational complexity of the UE.

Meanwhile, where the plurality of DCIs (e.g., DCI1 and DCI2) are detected at different times (or slots) (and/or unless MPUL PUSCH transmission is scheduled to be performed for the total rank at the same time (or slot) by setting an independent scheduling offset value in each DCI), the UE may recognize it as independent SPUL transmission scheduling, rather than scheduling of multi-panel uplink (MPUL) transmission, and transmit the PUSCH. As a specific example, the UE may transmit the individual SPUL PUSCH according to DCI1 and the individual SPUL PUSCH according to DCI2.

Or, it may be determined whether the DCIs are used for scheduling multi-panel uplink (MPUL) transmission based on the resource allocation (RA) field values in the plurality of DCIs transmitted from the base station.

As an example, where the RA field values in the plurality of DCIs (e.g., DCI1 and DCI2) transmitted from the base station are identical, the UE may determine that the DCIs are information for scheduling multi-panel uplink (MPUL) transmission. (Thus, the base station may be required to always include the same RA field value in the DCIs (e.g., DCI1 and DCI2) and transmit the same to schedule MPUL transmission.) In other words, where the resource regions corresponding to the RA field values individually contained in at least two or more DCIs overlap, it may be determined that scheduling information for MPUL transmission is received. The above-described method may allow multi-panel uplink (MPUL) PUSCH transmission to be performed only in the frequency bands fully overlapped all the time. This may reduce the implementational complexity of the UE and effectively simplify and/or normalize the design (e.g., common and arranged operations for system design).

As another example, the RA field values in the DCIs (e.g., DCI1 and DCI2) for scheduling multi-panel uplink (MPUL) transmission may be set to be different and/or independent from each other, and the UE may recognize the RA field value as valid. Thus, even in the frequency band partially overlapped or non-overlapped by the RA field values in the DCIs, transmission of the multi-panel uplink (MPUL) may be scheduled, and the UE may perform multi-panel uplink (MPUL) PUSCH transmission based on the scheduling of the multi-panel uplink (MPUL) transmission. As a specific example, where multi-panel uplink (MPUL) PUSCH transmission is scheduled in the partially overlapped frequency bands, as many PUSCH layers as the total sum of the numbers of layers indicated in DCI1 and DCI2 may be transmitted in the overlapped band. In the remaining scheduling band, only as many PUSCH layer(s) as the number of layers indicated in a specific DCI may be transmitted. In such a manner, the multi-panel uplink (MPUL) PUSCH packet may be configured, and the UE may perform MPUL PUSCH transmission.

As another example, where the scheduled frequency location is not overlapped, e.g., when the RA field values in DCI1 and DCI2 are set in the form of a non-overlapped frequency band being allocated (in particular, even though DCIs for scheduling multi-panel uplink (MPUL) transmission are received at the same time (or slot)), the UE may recognize them as DCIs for scheduling of independent SPUL transmission, rather than DCIs for scheduling of MPUL transmission, and transmit the PUSCH. As a specific example, the UE may perform the individual SPUL PUSCH transmission according to DCI1 and the SPUL PUSCH transmission according to DCI2.

The above-described RA field value-based MPUL transmission (e.g., MPUL transmission in at least one band of the fully overlapped band, partially overlapped band, or non-overlapped band) may be controlled by the base station for its enabling and disabling, via a separate higher layer parameter (e.g., RRC and/or MAC-CE). Thus, it is possible to secure flexibility for scheduling of the base station and improve the performance of the base station.

As described above, given transmission of a plurality of DCIs to schedule MPUL transmission without significantly changing the conventional DCI payload, a validity check may be needed to allow the UE to clearly recognize that the plurality of DCIs are for scheduling MPUL transmission. Proposed below is a method for utilizing a specific field in the DCI for validity check purposes.

For example, only when the value of a specific field in the plurality of DCIs (e.g., DCI1 and DCI2) transmitted from the base station is always the same, the UE may determine that the DCIs are information for scheduling multi-panel uplink (MPUL) transmission. The method may be regarded as a method for utilizing the value of a specific field in each DCI for validity check purposes. As a specific example, where the value of at least one of the DCI fields described below is the same, the UE may be recognized as receiving valid DCIs for scheduling multi-panel uplink (MPUL) transmission.

Carrier indicator
UL/SUL(Supplementary uplink) indicator (UL/SUL indicator)
Bandwidth part indicator
Frequency hopping flag
$1^{st}$ downlink assignment index
$2^{nd}$ downlink assignment index
CBG transmission information (CBGTI)
beta_offset indicator
New data indicator
However, this field is allowed to be set to differ per DCI. As an example, upon scheduling MPUL transmission, only some specific DCI(s) are new data transmission, and the other DCI(s) are retransmission.
Redundancy Version and/or HARQ Process Number
However, this field is allowed to be set to differ per DCI. As an example, upon scheduling MPUL transmission, only some specific DCI(s) may be rendered to have a commonly shared field value, and the other DCI(s) are set to have different and/or independent field values.

TPC Command for Scheduled PUSCH

However, this field is allowed to be set to differ or be independent per DCI. As an example, upon scheduling MPUL transmission, specific some DCI(s) may be rendered to follow specific power control, and the other DCI(s) to follow other specific power control. By so doing, it may be allowed to be supported for the purpose of a power control effect based on a specific beam and/or uplink-coordinated multipoint (CoMP) scheduling to allow MPUL PUSCH transmission to be initiated for each different reception point.

DMRS Sequence Initialization

However, this field is allowed to be set to differ or be independent per DCI. As an example, upon scheduling MPUL transmission, some specific DCI(s) may be allowed to perform PUSCH DMRS transmission with a specific DMRS sequence, and the other DCI(s) to perform PUSCH DMRS transmission with another specific DMRS. Thus, it is possible to support flexible MPUL transmission scheduling (including uplink-CoMP scheduling purposes).

PTRS-DMRS Association

However, this field may be set to be identical or is allowed to be set to differ per DCI. Further, it may be allowed to be known what field value (e.g., same or different) is set by an additional enabler. As an example, the phase tracking reference signal (PTRS) is for designating the location to allow time-domain samples to be shown interworking with a specific demodulation reference signal (DMRS) port location. The complexity may be reduced by commonly setting the shift and/or offset value in the frequency domain (in the given PRB) in the DCIs for scheduling MPUL transmission. Or, the flexibility of scheduling may be enhanced by setting a different and/or independent value in each DCI.

Meanwhile, as the plurality of DCIs are transmitted for scheduling multi-panel uplink (MPUL) transmission, the UE may suffer from an increase in complexity upon performing blind detection on the DCIs. To reduce the complexity of blind detection of the UE, the base station may transmit, to the UE, configuration information regarding a specific slot index(es) for which the DCI(s) for scheduling multi-panel uplink (MPUL) transmission needs to be monitored. For example, the base station may provide a message, e.g., a specific slot index bitmap, as the configuration information regarding the slot index(es), via RRC and/or MAC-control element (CE). The complexity of UE blind detection may be reduced by allowing the UE to perform blind detection on the plurality of DCIs only for the received slot index(es).

<Method 2>

As described above, the base station may transmit a plurality of DCIs for scheduling of MPUL transmission to the UE. At this time, the method of configuring and/or interpreting the information included in the DCIs may be varied depending on whether the DCIs are for scheduling of SPUL transmission or for scheduling of MPUL transmission. Here, for ease of description, it is assumed that the base station transmits two DCIs including DCI1 and DCI2. However, this is merely an example and is not intended to limit the technical spirit of the disclosure. Thus, the disclosure may also be applied to two or more DCIs.

Where the DCIs are for SPUL scheduling, the transmitted precoding matrix indicators (e.g., TPMI1 and TPMI2) independently indicated by the internal fields of the DCIs (e.g., DCI1 and DCI2) may become precoder indication information for each DCI. In contrast, upon scheduling of MPUL transmission, all the layers where MPUL PUSCH is transmitted may be configured in the form of the sum (combination) of the layers individually indicated by the DCIs. Accordingly, precoder co-phasing information of specific K bits in total may be additionally required to connect the TPMIs (e.g., TPMI1 and TPMI2) independently indicated by the internal fields of the DCIs (e.g., DCI1 and DCI2). Described below is a method and/or embodiment of interpreting and/or configuring co-phasing information of precoder in a plurality of DCIs for scheduling of multi-panel uplink (MPUL) transmission. Here, for ease of description, it is assumed that co-phasing information of K=2 bits in total is needed. However, this is merely an example and is not intended to limit the technical spirit of the disclosure.

For example, the base station may allocate K bits (e.g., two bits) to DCI1 and K bits (e.g., two bits) to DCI2 and transmit duplicate information. Despite the K-bit information recognized by the UE via any one DCI among the DCIs, if the DCI is information for MPUL transmission scheduling, the K bits may be utilized as co-phasing information to connect TPMI1 and TPMI2 upon MPUL PUSCH transmission, obtaining and transmitting the MPUL PUSCH precoder. Although the information overlaps if the UE detects both DCI1 and DCI2, the method may advantageously keep the bit width between DCI1 and DCI2 uniform.

As described above, if DCI1 and DCI2 correspond to DCIs for scheduling of individual SPUL transmission, like they are received at different times (or different slots) or have non-overlapped resource allocation (RA) field values, the UE may ignore or discard the K-bit co-phasing information. Further, the UE may not reflect the information corresponding to the K bits upon generating the SPUL PUSCH precoder corresponding to each DCI.

As another example, the base station may divide the total K-bit co-phasing information by the total number of DCIs for scheduling of MPUL transmission and assign the obtained bits for each DCI. As a specific example, when the total co-phasing information is K=2 bits, transmission may be performed, with DCI1 including one most significant bit (MSB) and DCI2 including one least significant bit (LSB). If the UE effectively detect both the two DCIs as MPUL transmission scheduling, one-bit information of each may be concatenated (combined) to produce total K=2 bit co-phasing information and apply the same upon obtaining the MPUL PUSCH precoder. This method may optimize the bit width (size) of each DCI and reduce the overhead of the control channel. In the above-described method, the co-phasing information may be valid only when the plurality of DCIs for scheduling of the MPUL transmission all are successfully or effectively detected.

In the above-described method of encoding one MSB bit in DCI1 and one LSB bit in DCI2, the UE may be required to recognize the ordering of DCI1 and DCI2. As a method for recognizing the ordering of the DCIs, RNTI and/or a control channel index, e.g., CORESET, may be used as described below.

Meanwhile, as described above, if DCI1 and DCI2 correspond to DCIs for scheduling of individual SPUL transmission, like they are received at different times (or slots) or have non-overlapped resource allocation (RA) field values, the UE may ignore or discard the co-phasing information and may not reflect the co-phasing information upon generating the SPUL PUSCH precoder corresponding to each DCI.

As another example, the total K-bit co-phasing information may be transmitted via a specific DCI (e.g., DCI1), as a representative, predetermined among all the DCIs for scheduling of MPUL transmission. Thus, it is possible to prevent unnecessary duplicate transmission and reduce the overhead of control channel. In the above-described method, the UE may be required to recognize the ordering of the DCIs (e.g., DCI1 and DCI2). As a method for recognizing the ordering of the DCIs, RNTI and/or a control channel index, e.g., CORESET, may be used as described below.

Meanwhile, as described above, if DCI1 and DCI2 correspond to DCIs for scheduling of individual SPUL transmission, like they are received at different times (or different slots) or have non-overlapped resource allocation (RA) field values, the UE may ignore or discard the co-phasing information and may not reflect the co-phasing information upon generating the SPUL PUSCH precoder corresponding to each DCI.

As another example, the total K-bit co-phasing information may be separately transferred via a separate DCI.

As another example, the total K-bit co-phasing information may be transferred via a separate L2-layer indication (e.g., MAC-CE).

As another example, the total K-bit co-phasing information may not separately be transferred. Further, it is possible to adopt a specific higher layer indicator to indicate (e.g., enable or disable) whether to support co-phasing information. For example, the co-phasing information being not supported may mean that there is no likelihood of interference (non-coherency) between the panels (or TX chains) of the UE for MPUL PUSCH transmission. The above-described method may also be effective in the environment that the beamforming area differs between the panels (or Tx chains) of the UE and the degree of interference is not significant although transmission is performed without co-phasing information. Or, it may be effective in system operation that is based on the operation of interference avoidance by the RA field partially overlapped or non-overlapped without co-phasing processing, e.g., in method 1 described above.

In relation to the modulation and coding scheme (MCS) field value in the DCIs (e.g., DCI1 and DCI2) transmitted from the base station, it itself may serve as complete MCS information independently indicated in the scheduling of SPUL transmission by the individual DCIs. In contrast, as described above, in the scheduling of MPUL transmission, all the layers where the MPUL PUSCH is transmitted may be configured in the form of the sum (combination) of the layer(s) individually indicated by the DCIs. Thus proposed is a configuration of the UE and/or base station and/or an interpreting method in relation to the MCS field value in each DCI among the plurality of DCIs for scheduling of multi-panel uplink (MPUL) transmission.

For example, the UE may expect that the MCS field values in the DCIs (e.g., DCI1 and DCI2) for scheduling of MPUL transmission are always the same. (Thus, the base station may be required to always transmit the same MCS field value via the DCIs (e.g., DCI1 and DCI2).) As a specific example, the same MCS field value may be set as the lowest MCS value among the link qualities corresponding to the DCIs or as the mean MCS value. The method presents the effect that the base station determines a single MCS from a single codeword and scheduling of MPUL transmission is designed.

As another example, the MCS field values in the DCIs (e.g., DCI1 and DCI2) for scheduling of MPUL transmission may be set or indicated differently and/or independently. As described above, however, if the UE successfully detects both DCI1 and DCI2, or is configured to transmit all the PUSCH layers scheduled from each DCI at the same time (or same slot), or the DCIs detected by the UE are information for scheduling of MPUL transmission, like it is scheduled by the resource allocation field value overlapped, even partially, the MCS value indicated in a specific DCI may be configured to be jointly applied to all the PUSCH layers as per a predetermined rule. Here, the predetermined rule may follow at least one of i) and ii) as follows.

i) The MCS value indicated in a specific representative DCI may be followed. As a specific example, the MCS value indicated in the DCI with the lowest index may be followed. Or, the MCS value indicated in the DCI with the lowest CORESET may be followed. The above-described methods may be operated based on the UE being able to recognize the ordering of the DCIs (e.g., DCI1 and DCI2). As a method for recognizing the ordering of the DCIs, RNTI and/or a control channel index, e.g., CORESET, may be used as described below.

ii) The lowest MCS value may be followed. Or, the highest MCS value may be followed. Or, the MCS value according to a specific function (e.g., the mean value or median value) may be followed. The operation rule as to what MCS value (maximum, minimum, mean, or median value0 is to be followed may be configured by the higher layer, so that the flexibility of implementation of the base station may be increased.

As described above, the method of allowing a different and/or independent MCS field value to be set for each DCI may be configured in association with the rule or operation of mapping a (flexible) codeword (CW), which is based on two or more codewords, to the layer (CW-to-layer) in scheduling of the MPUL transmission. As a specific example, two codewords may be defined in DCI1 and DCI2 for scheduling of MPUL transmission, and an MCS value may be separately set per CW and may be specified to be indicated from each DCI. In association therewith, despite transmission of an ACK and/or NACK from the base station, an individual ACK and/or NACK message may be subsequently provided to the UE while interworking per CW (per MCS field and per DCI), and the operation in which retransmission occurs only in the CW where an NACK is received may be indicated based thereupon.

As mentioned above, where the PUSCH of the MPUL transmission scheme is scheduled, the UE is needed to recognize a specific ordering for the plurality of involving DCIs (e.g., DCI1 and DCI2). Proposed below is a method in which the UE recognizes an ordering of a plurality of DCIs.

As an example, as a method in which the UE recognizes an ordering of a plurality of DCIs, a method of using the RNTI value may be considered. When the UE attempts to perform blind detection on the DCIs (e.g., DCI1 and DCI2), the UE may set the RNTI value for performing, e.g., cyclic redundancy check (CRC) operation, differently and/or independently for each DCI. As a specific example, DCI1 may be CRC masked with C-RNTI1, and DCI2 may be CRC masked with C-RNTI2. Where a specific DCI masked with C-RNTI1 is detected, the UE may recognize that the DCI is DCI1. The method may present the effect of not increasing the complexity of the blind detection (BD) of the UE. In other words, the DCI for scheduling of normal SPUL transmission may be CRC masked with the C-RNTI value, and the paired DCIs for scheduling of MPUL transmission may be separately masked with C-RNTI1, C-RNTI2, . . . The paired DCIs mean a plurality of DCIs for scheduling of MPUL transmission.

Or, among the plurality of DCIs, one specific DCI (e.g., DCI1) may be CRC masked with a normal C-RNTI value, and the other DCIs (e.g., DCI2) may be CRC masked with a separate C-RNTI1.

As a method for allowing the UE to recognize the number of the paired DCIs for scheduling of MPUL transmission more dynamically, the number of C-RNTIs may be recognized as the number of DCIs. For example, if at least one DCI masked with C-RNTI1 is detected, the UE may regard it as only SPUL PUSCH being scheduled at the time of PUSCH transmission and thus may not expect other DCIs. Or, if at least one DCI masked with C-RNTI2 is detected (at the time of PUSCH transmission), the UE may regard it as MPUL PUSCH transmission involved by two DCIs having been scheduled. At this time, where the UE detects only one C-RNTI2 masked DCI, the UE expects another DCI (e.g., via other CORESET, control channel resource) and is required to perform additional blind detection. As in the above-described method, if there is a DCI detected with C-RNTI3, a total of three DCIs may be recognized as having scheduled the MPUL PUSCH transmission and, as such, the number of DCIs for scheduling of MPUL transmission may be recognized via the number of C-RNTIs. Since this method allows the UE to recognize the number of paired DCIs, a specific error propagation context may be avoided.

The ordering information for the DCIs may be explicitly indicated by designating a specific ordering and/or flag field in each DCI. For example, the base station may explicitly indicate what number of DCI it is via the ordering field in each of DCI1 and DCI2.

The ordering of DCIs may be implicitly indicated in association with a specific component unit (e.g., CCE index, REG index, specific frequency, and/or time resource index) of the control channel where each DCI is transmitted. For example, a predefined specific rule may be applied, such as allowing the DCI corresponding to the lowest CCE index for DCI1 and DCI2 detected to be recognized as the first (or lower) DCI.

Or, information (e.g., CORESET ID, specific search space, or UE specific search space (USS)) related to a specific control channel (identification (ID)) where the paired DCIs may be transmitted may be previously transferred to the UE via RRC and/or MAC-CE. By so doing, the specific control channels (e.g., CORESET) where the paired DCIs (e.g., DCI1 and DCI2) are transmitted may be previously paired and configured. Since the UE may be previously aware of each specific control channel (e.g., CORESET) for which blind detection of the paired DCIs (e.g., DCI1 and DCI2) needs to be attempted, it may be possible to mitigate the complexity of blind detection of the UE. Further, by the above-described method, the UE may recognize the ordering of the DCIs (e.g., DCI1 and DCI2) involving the scheduling of MPUL PUSCH transmission. As a specific example, a specific rule using the CORESET ID to allow the UE to recognize the ordering of DCIs may be determined, like allowing the DCI detected on the control channel corresponding to the lowest CORESET ID to be recognized as DCI1.

<Method 3>

According to methods 1 and 2 described above, the UE may receive the plurality of DCIs for scheduling of multi-panel uplink (MPUL) transmission and, based thereupon, perform multi-panel uplink (MPUL) transmission. At this time, each inter-panel transmission condition needs to be considered in multi-panel-based uplink transmission.

According to the scheduling (e.g., DCI1 and DCI2) of MPUL transmission, a method for applying a specific timing advance (TA) command and TA value between the panels is proposed in multi-panel-based uplink (e.g., PUSCH) transmission.

As an example, the TA command and TA value may be differently and/or independently applied for each panel. The method may adjust the reception timing on the end of the base station and adjust the time of transmission of the UE, considering, e.g., uplink coordinated multi-point (UL-CoMP). As a specific example, the UE performing MPUL transmission may apply the TA command and TA value according thereto, differently and/or independently per panel. Each panel may perform uplink transmission to at least one reception end (e.g., the base station or multiple transmission/reception point (TRP)), and may apply a different TA value depending on the UE itself and the context of the reception end and adjust the timing. Further, the operation of applying the TA command and TA value per panel may also be configured by the indicator or enabler of a specific higher layer.

As another example, upon PUSCH transmission of MPUL transmission scheme, the panels performing MPUL transmission may allow the common TA to be applied. This may reduce the complexity of the system design and enables the system to be simplified and/or perform arranged operations.

Further, according to scheduling (e.g., DCI1 and DCI2) of MPUL transmission, in multi-panel-based uplink (e.g., PUSCH) transmission, a method is proposed for configuring a power control (PC) parameter set of uplink (e.g., PUSCH) between panels.

As an example, upon uplink transmission according to the scheduling of MPUL transmission, the power control (PC) parameter set of PUSCH may be configured as limited to a (i) single PC parameter set over the entire MPUL transmission. This method may reduce the complexity of the system design and enables the system to be simplified and/or perform arranged operations. Or, (ii) it may be configured to follow the PC parameter set indicated by a specific (beam and/or precoder-related) indicator field and/or state, like the SRI state indicated per DCI for scheduling of MPUL transmission.

More specifically, a higher-layer indicator or enabler such as a specific 'usage' parameter may be adopted so that the configurable unit of the PC parameter set may be interworked and determined depending on the set value of the 'usage' parameter. If the 'usage' value is set to, e.g., "MPUL (only)," it may be operated as per (i) above and, if the 'usage' value is set to, e.g., "UL-CoMP (and MPUL)," it may be operated as per (ii) above.

The UE may perform multi-panel uplink (MPUL) transmission via the above-described embodiments and/or methods proposed herein. In this case, a plurality of DCIs may be transmitted to the UE for scheduling of multi-panel uplink (MPUL) transmission so that it may be used without significantly changing the payload size of the existing DCI, and the complexity of blind detection of the UE may be reduced.

FIG. 9 illustrates an example signaling procedure between a UE and a base station performing uplink channel transmission/reception to which an embodiment proposed in the disclosure is applicable. FIG. 9 is intended merely for illustration purposes but not for limiting the scope of the disclosure.

Referring to FIG. 9, the UE and/or base station are assumed to operate based on methods 1 to 3 and embodiments described above. In particular, for scheduling of uplink transmission based on multi-panel as proposed in the disclosure, the UE and/or base station may receive and/or transmit a plurality of DCIs. A specific procedure is as follows.

The base station may transmit information for uplink scheduling to the UE (S910). Here, the information for uplink scheduling may include at least two or more DCIs.

Thereafter, the UE may determine whether the at least two or more received DCIs are used for scheduling of multi-panel uplink (MPUL) transmission (S920). For example, a method for determining whether the DCIs received by the UE are used for scheduling multi-panel uplink (MPUL) transmission may be based on method 1 described above. As a specific example, the UE may determine whether the DCI(s) are for scheduling of MPUL transmission depending on the number of the received DCI(s). Where the base station transmits a plurality of DCIs, if the UE successfully receives at least two or more DCIs among the transmitted DCIs, the UE may be determined to receive the information for scheduling MPUL transmission. Or, upon receiving all of the plurality of DCIs transmitted from the base station, the UE may be determined to receive the information for scheduling of MPUL transmission.

As another example, the UE may determine whether the DCI(s) are for scheduling of MPUL transmission, with respect to the reception timing of the plurality of DCIs transmitted from the base station. When the UE receives the plurality of DCIs at the same time (e.g., same slot), it may be determined that DCIs for scheduling of MPUL transmission have been received. Or, where uplink transmission is scheduled to be performed together for all the ranks at the same time (e.g., same slot) based on at least one of the scheduling offset or the reception timing of each of at least two or more DCIs, the DCIs may be determined to be valid DCIs for scheduling of MPUL transmission.

As another example, it may be determined whether the DCIs are used for scheduling multi-panel uplink (MPUL) transmission based on the resource allocation (RA) field values in the plurality of DCIs transmitted from the base station. Where the resource regions corresponding to the resource allocation field values individually contained in at least two or more DCIs overlap, the DCIs may be determined to be DCIs for scheduling of MPUL transmission. At this time, the resource allocation field values may be identical so that they may completely overlap, or partially overlap.

Thereafter, the UE may perform multi-panel uplink (MPUL) transmission to the base station based on the at least two or more DCIs (S930). For example, the UE may map the information contained in each of the at least two or more DCIs with each panel constituting the multi-panel and perform uplink transmission. As a specific example, the UE may map the SRS resource corresponding to each SRI indicated in the at least two or more DCIs to the panel (or Tx chain) transmitted previously (e.g., at the latest time before the reception timing of each DCI), apply the SRS beam and each indicated rank value and each TPMI, and transmit the MPUL PUSCH. The total rank upon MPUL PUSCH transmission may be calculated as the sum (combination) of the rank values indicated by the DCIs.

FIG. 10 is an example flowchart illustrating operations of a UE performing uplink transmission to which an embodiment as proposed in the disclosure is applicable. FIG. 10 is intended merely for illustration purposes but not for limiting the scope of the disclosure.

Referring to FIG. 10, the UE and/or base station are assumed to operate based on methods 1 to 3 and/or embodiments described above. In particular, for scheduling of uplink transmission based on multi-panel as proposed in the disclosure, the UE and/or base station may receive and/or transmit a plurality of DCIs. A specific procedure is as follows.

The UE may receive at least two or more downlink control information (DCIs) from the base station (S1010). The DCIs may correspond to information for uplink scheduling.

The UE may determine whether the at least two or more received DCIs are used for scheduling of multi-panel uplink (MPUL) transmission (S1020). For example, a method for the UE to determine whether the at least two or more DCIs are used for scheduling multi-panel uplink (MPUL) transmission may be based on methods 1 and 2 described above. As a specific example, where the UE successfully receives at least two or more DCIs among the DCIs transmitted from the base station, the UE may be determined to receive the DCIs for scheduling MPUL transmission. Or, where the UE successfully receives the plurality of DCIs transmitted from the base station, the UE may be determined to receive the DCIs for scheduling MPUL transmission.

As another example, where the UE receives the at least two or more DCIs at the same time (e.g., same slot), the DCIs may be determined to be DCIs for scheduling of MPUL transmission. Or, where uplink transmission is scheduled to be performed together for all the ranks at the same time (e.g., same slot) based on at least one of the scheduling offset or the reception timing of each of at least two or more DCIs, the UE may determine that the DCIs are information for scheduling of valid MPUL transmission.

As another example, where the resource allocations corresponding to the resource allocation (RA) field values of the at least two or more DCIs overlap, the UE may determine that MPUL transmission has been scheduled in the corresponding region. The resource allocations may be fully overlapped (i.e., when the same RA field value is set) or partially overlapped.

The UE may perform multi-panel uplink (MPUL) transmission to the base station based on the at least two or more DCIs (S1030). For example, the UE may perform multi-panel uplink (MPUL) transmission based on methods 1 to 3 described above. As a specific example, the UE may map the information contained in each of the at least two or more DCIs with each panel constituting the multi-panel and perform uplink transmission. Or, multi-panel uplink (MPUL) transmission may be performed based on the sum (combination) of the information included in each of the at least two or more DCIs for scheduling of MPUL transmission. The UE may map the SRS resource corresponding to each SRI indicated in the at least two or more DCIs to the panel (or Tx chain) transmitted previously (e.g., at the latest time before the reception timing of each DCI), apply the SRS beam and each indicated rank value and each TPMI, and transmit the MPUL PUSCH. At this time, the total rank upon MPUL PUSCH transmission may be calculated by combining (summating) the rank values indicated by each DCI.

As another example, upon multi-panel-based uplink PUSCH transmission, a specific timing advance (TA) command and TA value to be applied may be applied differently and/or independently for each panel, depending on the scheduling of MPUL transmission. Or, upon MPUL PUSCH transmission, a common TA value may be applied. Further, upon multi-panel uplink (MPUL) transmission, the power control (PC) parameter set of PUSCH may be configured as a single PC parameter set over the entire MPUL transmission. Or, it may be set to follow the PUSCH PC parameter set indicated per DCI for scheduling of MPUL transmission.

FIG. 11 is another example flowchart illustrating operations of a UE performing uplink transmission to which an embodiment as proposed in the disclosure is applicable. FIG. 11 is intended merely for illustration purposes but not for limiting the scope of the disclosure.

Referring to FIG. 11, the UE and/or base station are assumed to operate based on methods 1 to 3 and/or embodiments described above. In particular, for scheduling of uplink transmission based on multi-panel as proposed in the disclosure, the UE and/or base station may receive and/or transmit a plurality of DCIs. A specific procedure is as follows.

The UE may transmit first information related to the number of DCIs, which may be received by the UE, to the base station (S1110). For example, the first information may be set to the maximum value that may be set by the UE and/or a value preferred by the UE. As a specific example, if N=1, then the base station may determine that the UE is a UE for which MPUL transmission scheme is not supported (and/or the state where although MPUL transmission scheme is implemented to be supported, calibration or verification has not been done or the MPUL transmission scheme is not favored). Further, if N>1, then the base station may receive N DCIs and determine that MPUL transmission may be scheduled. The first information may be transmitted via a separate reporting or recommendation signal after RRC connection and/or capability signaling.

The UE may receive second information related to the number of DCIs for scheduling of multi-panel uplink (MPUL) transmission to be received by the UE from the base station (S1120). For example, the second information may be set based on the first information. As a specific example, the number of DCIs to be received by the UE, which corresponds to the second information, may be equal to or smaller than the number of DCIs receivable by the UE, which corresponds to the first information. Further, the second information may be configured in units of component carrier (CC) or bandwidth part (BWP). Further, the second information may be received via RRC signaling from the base station. Multiple candidate values, for the number of DCIs to be received by the UE via RRC signaling, may be received and then the number of DCIs to be actually received by the UE via MAC-CE and/or DCI may be received step-by-step. Or, some values may be extracted by MAC-CE, and the final value may be received by DCI.

The UE may receive information related to the resource where information for uplink scheduling is to be received from the base station (S1130). The information for uplink scheduling may include at least two or more DCIs. For example, the information related to the resource where the DCIs are to be transmitted may be received based on methods 1 and 2 described above. As a specific example, the UE may receive configuration information regarding a specific slot index(es) for which the DCI(s) for uplink scheduling needs to be monitored from the base station. As an example, as the configuration information regarding the slot index(es), a message, such as a specific slot index bitmap, may be received. As another example, information related to a specific control channel (identification (ID)) where the at least two or more DCIs may be transmitted may be received from the base station. As an example, the control channel-related information may correspond to, e.g., the CORESET ID, specific search space, or UE specific search space (USS).

The UE may receive at least two or more DCIs from the base station (S1140). The DCIs may correspond to information for uplink scheduling.

The UE may determine whether the at least two or more received DCIs are used for scheduling of multi-panel uplink (MPUL) transmission (S1150). For example, a method for the UE to determine whether the at least two or more DCIs are used for scheduling multi-panel uplink (MPUL) transmission may be based on methods 1 and 2 described above.

Steps S1140 and 1150 correspond to S1010 and S1020 of FIG. 10, and thus, no duplicate description thereof is given below.

The UE may determine at least one of the number or order of at least two or more DCIs included in the uplink scheduling information (S1160). For example, the method of determining the number or order of DCIs may be performed based on method 2 described above. As a specific example, as a method for differentiating the order of the at least two or more DCIs, the RNTI value may be used. A different and/or independent RNTI value may be set per DCI, and the UE may determine the order of DCIs depending on what RNTI value they have been masked with. As a specific example, DCI1 may be CRC masked with C-RNTI1, and DCI2 may be CRC masked with C-RNTI2. Where a specific DCI masked with C-RNTI1 is detected, the UE may recognize that the DCI is DCI1.

As another example, the UE may be configured to recognize the number of C-RNTIs as the number of DCIs. For example, if at least one DCI masked with C-RNTI1 is detected, the UE may determine that only SPUL PUSCH has been scheduled at the time of PUSCH transmission and thus may not expect other DCIs. Or, if at least one DCI masked with C-RNTI2 is detected (at the time of PUSCH transmission), the UE may determine that MPUL PUSCH transmission involved by two DCIs have been scheduled. At this time, where the UE detects only one C-RNTI2 masked DCI, the UE expects another DCI and is required to perform additional blind detection. As in the above-described method, if a DCI masked with C-RNTI3 is detected, it may be determined that a total of three DCIs have been transmitted for scheduling of MPUL transmission and, as such, the number of DCIs for scheduling of MPUL transmission may be recognized via the number of C-RNTIs.

Or, the ordering information for the DCIs may be explicitly received via a specific ordering and/or flag field in each DCI.

The ordering information for implicit DCIs may be received in association with a specific component unit (e.g., CCE index, REG index, specific frequency, and/or time resource index) of the control channel where each DCI is transmitted. For example, information, such as a predefined, specific rule, may be received to allow the DCI ordering to be recognized from the CCE index.

As another example, predetermined rule information to allow the ordering of DCIs to be recognized from the CORESET ID may be received, like allowing the DCI detected on the control channel corresponding to the lowest CORESET ID to be recognized as DCI1.

The UE may perform multi-panel uplink (MPUL) transmission to the base station based on the at least two or more DCIs (S1170). For example, the UE may perform multi-panel-based uplink transmission based on methods 1 to 3 described above. This step may correspond to step S1030 of FIG. 10. Thus, no detailed description is given.

In FIG. 11, some steps may be omitted or replaced with other steps in some cases. As an example, the above-described steps, S1120, S1130, and S1160, may be omitted in some cases.

FIG. 12 is an example flowchart illustrating operations of a base station performing uplink transmission to which an embodiment as proposed in the disclosure is applicable. FIG. 12 is intended merely for illustration purposes but not for limiting the scope of the disclosure.

Referring to FIG. 12, the UE and/or base station are assumed to operate based on methods 1 to 3 and/or embodiments described above. In particular, for scheduling of uplink transmission based on multi-panel as proposed in the disclosure, the UE and/or base station may receive and/or transmit a plurality of DCIs. A specific procedure is as follows.

The base station may receive first information related to the number of DCIs, which may be received by the UE, from the UE (S1210). For example, the first information may be set to the maximum value that may be set by the UE and/or a value preferred by the UE.

The base station may transmit second information related to the number of DCIs for scheduling of multi-panel uplink (MPUL) transmission to be transmitted by the base station to the UE (S1220). For example, the second information may be set based on the first information. As a specific example, the number of DCIs to be transmitted by the base station, which corresponds to the second information, may be equal to or smaller than the number of DCIs receivable by the UE, which corresponds to the first information. Further, the second information may be configured in units of component carrier (CC) or bandwidth part (BWP). Further, the base station may transmit the second information via RRC signaling. Multiple candidate values, for the number of DCIs to be transmitted by the base station via RRC signaling, may be transmitted and then the number of DCIs to be actually transmitted by the base station via MAC-CE and/or DCI may be transmitted step-by-step. Or, some values may be extracted by MAC-CE, and the final value may be transmitted by DCI.

Steps S1210 and/or S1220 described above may be omitted in some cases.

The base station may transmit at least two or more DCIs to the UE (S1230). The DCIs may correspond to information for uplink scheduling. For example, where the base station transmits the at least two or more DCIs for scheduling of multi-panel uplink (MPUL) transmission, the DCIs may be transmitted or configured based on, e.g., the above-described method 1 or method 2.

As a specific example, the base station may transmit the at least two or more DCIs always at the same time (e.g., same slot) to schedule MPUL transmission. Or, the base station may set the same offset value in the at least two or more DCIs and transmit the same. The scheduling offset indicates the parameter for the purpose of flexibly indicating the transmission timing of PUSCH. Or, uplink transmission may be scheduled to be performed together for all the ranks at the same time (e.g., same slot) based on at least one of the scheduling offset or the reception timing of each of at least two or more DCIs.

As another example, the base station may set the same resource allocation (RA) field value in the at least two or more DCIs to schedule MPUL transmission and allows it to overlap the resource region. Or, the base station may set the RA field value to allow the resource region indicated by the resource allocation field value to partially overlap.

As another example, the base station may set the same value for the specific field in the DCIs to allow the UE to clearly recognize that the at least two or more DCIs are for scheduling of MPUL transmission. The UE may recognize that the DCIs are for scheduling of MPUL transmission only when the specific field values in the DCIs transmitted from the base station are the same. As a specific example, the same value may be set for at least one field of the carrier indicator, UL/SUL indicator, Bandwidth part indicator, Frequency hopping flag, $1^{st}$ downlink assignment index, $2^{nd}$ downlink assignment index, CBG transmission information (CBGTI), beta_offset indicator, or such DCI fields, and transmission may be performed. In this case, the UE may recognize that the DCIs are for scheduling of valid MPUL transmission.

As another example, the base station may include precoder co-phasing information in at least two or more DCIs for scheduling of MPUL transmission and transmit the same. As a specific example, the base station may allocate the same bit to each of the plurality of DCIs and transmit duplicate co-phasing information. Or, the base station may divide the total K-bit co-phasing information by the total number of DCIs for scheduling of MPUL transmission and assign the obtained bits for each DCI and transmit the same. Or, as a representative, the co-phasing information may be transmitted via a predetermined, specific DCI among all the DCIs for scheduling of MPUL transmission. Or, the base station may transmit the co-phasing information via a separate DCI. Or, the base station may transfer the co-phasing information via a separate L2-layer indication (e.g., MAC-CE).

As another example, the base station may set the same value in the MCS fields in the at least two or more DCIs for scheduling of MPUL transmission. As a specific example, the same MCS field value may be set as the lowest MCS value among the link qualities corresponding to the DCIs or as the mean MCS value. Or, the base station may be configured to follow the MCS value indicated by a specific representative DCI. As a specific example, the MCS value indicated in the DCI with the lowest index may be followed. Or, the MCS value indicated in the DCI with the lowest CORESET may be followed. Or, the base station may be configured to follow the lowest or highest MCS value. Or, the MCS value according to a specific function (e.g., the mean value or median value) may be followed.

As another example, the base station may be configured to allow the UE to recognize at least one of the number or order of the at least two or more DCIs for scheduling of MPUL transmission. For example, a method of using the RNTI value may be taken into consideration. As a specific example, the base station may differently and/or independently set an RNTI value per DCI. DCI1 may be CRC masked with C-RNTI1, and DCI2 may be CRC masked with C-RNTI2. Or, among the plurality of DCIs, one specific DCI (e.g., DCI1) may be CRC masked with a normal C-RNTI value, and the other DCIs (e.g., DCI2) may be CRC masked with a separate C-RNTI1. Or, the base station may be configured to allow the UE to recognize the number of DCIs for scheduling of MPUL transmission via the number of C-RNTIs. The ordering information for the DCIs may be explicitly indicated by designating a specific ordering and/or flag field in each DCI.

The base station may receive a multi-panel uplink (MPUL) from the UE (S1240). For example, based on the above-described methods 1 to 3, the base station may receive the multi-panel-based uplink PUSCH. As a specific example, according to the scheduling of MPUL transmission, a common timing advance (TA) may be applied to the multi-panel-based uplink PUSCH. Further, the power control (PC) parameter set of multi-panel-based uplink PUSCH may be configured as a single PC parameter set over the entire MPUL PUSCH transmission.

Overview of Devices to which Present Disclosure is Applicable

FIG. 13 is a block diagram of a wireless communication device to which methods proposed in the present disclosure may be applied.

Referring to FIG. 13, a wireless communication system may include a first device 1310 and a second device 1320.

The first device 1310 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

The second device 1320 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

For example, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the drone may be an unmanned aerial vehicle that may be flown by wireless control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 1310 may include at least one processor, such as a processor 1311, at least one memory, such as a memory 1312, and at least one transceiver, such as a transceiver 1313. The processor 1311 may perform the functions, procedures, and/or methods described above. The processor 1311 may perform one or more protocols. The processor 1311 may perform one or more layers of a radio interface protocol. The memory 1312 may be connected to the processor 1311 and store various types of information and/or commands. The transceiver 1313 may be connected to the processor 1311 and controlled to transmit/receive a radio signal.

As a specific example, the processor 1311 may control the transceiver 1313 to receive first information related to the number (e.g., N) of DCIs receivable by the second device 1320 from the second device 1320 (S1210). For example, the first information may be set to the maximum value that may be set by the second device 1320 and/or a value preferred by the UE.

Further, the processor 1311 may control the transceiver 1313 to transmit second information related to the number (e.g., N') of DCIs for scheduling of multi-panel uplink transmission to be transmitted by the first device 1310 to the second device 1320 (S1220). For example, the second information may be set based on the first information. Further, the second information may be configured in units of component carrier (CC) or bandwidth part (BWP).

Further, the processor 1311 may control the transceiver 1313 to transmit at least two or more DCIs to the second device 1320 (S1230). The DCIs may correspond to information for uplink scheduling.

Further, the processor 1311 may control the transceiver 1313 to receive the multi-panel uplink channel based on the at least two or more DCIs from the second device 1320 (S1240).

The second device 1320 may include at least one processor, such as a processor 1321, at least one memory, such as a memory 1322, and at least one transceiver, such as a transceiver 1323. The processor 1321 may perform the functions, procedures, and/or methods described above. The processor 1321 may implement one or more protocols. For example, the processor 1321 may implement one or more layers of the radio interface protocol. The memory 1322 may be connected to the processor 1321 and store various types of information and/or commands. The transceiver 1323 may be connected to the processor 1321 and controlled to transmit/receive a radio signal.

As a specific example, the processor 1321 may control the transceiver 1323 to receive at least two or more downlink control information (DCIs) from the first device 1310 (S1010). The DCIs may correspond to information for uplink scheduling. Further, the processor 1321 may control the transceiver 1323 to determine whether the at least two or more received DCIs are used for scheduling of multi-panel uplink (MPUL) transmission (S1020). Further, the processor 1321 may control the transceiver 1323 to perform multi-panel uplink transmission based on the at least two or more DCIs to the first device 1310 (S1030).

The memory 1312 and/or the memory 1322 may be each connected inside or outside the processor 1311 and/or the processor 1321 and connected to other processors through various techniques such as wired or wireless connection.

The first device 1310 and/or the second device 1320 may have one or more antennas. For example, an antenna 1314 and/or an antenna 1324 may be configured to transmit and receive the radio signal.

FIG. 14 illustrates another example of the block diagram of the wireless communication device to which the methods proposed in this disclosure may be applied.

Referring to FIG. 14, a wireless communication system includes an eNB 1410 and multiple user equipments 1420 positioned within an area of the eNB. The eNB may be represented by a transmitting apparatus and the UE may be represented by a receiving apparatus, or vice versa. The eNB and the UE include processors (1411,1421), memories (1414,1424), one or more Tx/Rx radio frequency (RF) modules (1415,1425), Tx processors (1412,1422), Rx processors (1413, 1423) and antennas (1416, 1426). The processor implements a function, a process, and/or a method which are described above. More specifically, a higher layer packet from a core network is provided to the processor 1411 in DL (communication from the eNB to the UE). The processor implements a function of an L2 layer. In the DL, the processor provides multiplexing between a logical channel and a transmission channel and allocation of radio resources to the UE 1420, and takes charge of signaling to the UE. The transmit (TX) processor 1412 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 1416 via individual Tx/Rx modules (or transceivers, 1415). Each Tx/Rx module may modulate an RF carrier into each spatial stream for transmission. In the UE, each Tx/Rx module (or transceiver, 1425) receives a signal through each antenna 1426 of each Tx/Rx module. Each Tx/Rx module reconstructs information modulated with the RF carrier and provides the reconstructed information to the receive (RX) processor 1423. The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the eNB. The soft decisions may be based on channel estimation values. The soft decisions are decoded and deinterleaved to reconstruct data and control signals originally transmitted by the eNB on the physical channel. The corresponding data and control signals are provided to the processor 1421.

UL (communication from the UE to the eNB) is processed by the eNB 1410 in a scheme similar to a scheme described in association with a receiver function in the UE 1420. Each Tx/Rx module 1425 receives the signal through each antenna 1426. Each Tx/Rx module provides the RF carrier and information to the RX processor 1423. The processor 1421 may be associated with the memory 1424 storing a program code and data. The memory may be referred to as a computer readable medium.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to a specific claim may be combined with another claim referring to the claims other than the specific claim to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

Although a method for performing uplink transmission in a wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method for performing uplink transmission by a user equipment (UE) in a wireless communication system, the method comprising:
receiving a plurality of downlink control information (DCI) from a base station;
determining the plurality of DCI used for a scheduling of uplink transmission;
scheduling the uplink transmission based on the plurality of DCI;
performing the uplink transmission to the base station, based on the plurality of DCI; and
transmitting, to the base station, first information related to a number of the plurality of DCI receivable by the UE,
wherein the plurality of DCI includes a DCI format 0_0 and a DCI format 0_1 related to the scheduling of the uplink transmission,
wherein the DCI format 0_1 includes at least one of modulation and coding scheme (MCS), frequency domain resource assignment, or time domain resource assignment,
wherein ordering information for the plurality of DCI is included in at least one of a specific ordering or flag field in each of the plurality of DCI, and
wherein ordering of the plurality of DCI is related to a Control Channel Element (CCE) index of control channels that the plurality of DCI is transmitted.

2. The method of claim 1, further comprising:
receiving, from the base station, second information related to a number of the plurality of DCI for the scheduling of uplink transmission to be received by the UE.

3. The method of claim 2, wherein the second information is configured in a unit of a component carrier or a bandwidth part (BWP).

4. The method of claim 1, wherein the plurality of DCI is received at a same time.

5. The method of claim 1, wherein the uplink transmission is transmitted at a same time based on at least one of a scheduling offset or a reception timing of each of the plurality of DCI.

6. The method of claim 1, wherein resource regions related to resource allocation field values individually included in the plurality of DCI is overlapped.

7. The method of claim 1, wherein the plurality of DCI includes at least one of an MCS field or precoder co-phasing information.

8. The method of claim 1, wherein
whether the plurality of DCI is used for scheduling of the uplink transmission is determined based on a specific field included in each of the plurality of DCI.

9. The method of claim 1, further comprising:
receiving, from the base station, information related to a resource where the plurality of DCI is transmitted.

10. The method of claim 1, wherein the uplink transmission is performed based on a combination of information included in each of the plurality of DCI.

11. The method of claim 10, wherein each of the plurality of DCI includes a SRS resource indicator (SRI), and
wherein a resource related to each SRI is mapped to each panel constituting a multi-panel,
and the uplink transmission is performed.

12. The method of claim 1, wherein
the uplink transmission is performed by applying at least one of a timing advance (TA) value or a power control parameter which are common per each panel of a multi-panel.

13. A user equipment (UE) configured to perform uplink transmission in a wireless communication system, the UE comprising:
at least one transceiver for communicating a radio signal; and
at least one processor functionally connected with the transceiver;
at least one memory including at least one instruction that, when executed by the at least one processor, perform operations comprising:
receiving a plurality of downlink control information (DCI) from a base station;
determining the plurality of DCI used for a scheduling of uplink transmission;
scheduling the uplink transmission based on the plurality of DCI;
performing uplink transmission to the base station, based on the plurality of DCI and
transmitting, to the base station, first information related to a number of the plurality of DCI receivable by the UE,
wherein the plurality of DCI includes a DCI format 0_0 and a DCI format 0_1 related to the scheduling of the uplink transmission,
wherein the DCI format 0_1 includes at least one of modulation and coding scheme (MCS), frequency domain resource assignment, or time domain resource assignment,
wherein ordering information for the plurality of DCI is included in at least one of a specific ordering or flag field in each of the plurality of DCI, and
wherein ordering of the plurality of DCI is related to a control channel element (CCE) index of control channels that the plurality of DCI is transmitted.

* * * * *